United States Patent
Kim

(10) Patent No.: US 11,968,434 B2
(45) Date of Patent: Apr. 23, 2024

(54) CAMERA MODULE HAVING A LIQUID LENS AND A VOLTAGE CONTROL CIRCUIT

(71) Applicant: LG INNOTEK CO., LTD., Seoul (KR)

(72) Inventor: Chang Wook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 913 days.

(21) Appl. No.: 16/964,496

(22) PCT Filed: Jan. 22, 2019

(86) PCT No.: PCT/KR2019/000896
§ 371 (c)(1),
(2) Date: Jul. 23, 2020

(87) PCT Pub. No.: WO2019/146993
PCT Pub. Date: Aug. 1, 2019

(65) Prior Publication Data
US 2021/0037171 A1    Feb. 4, 2021

(30) Foreign Application Priority Data

Jan. 23, 2018  (KR) ........................ 10-2018-0008277

(51) Int. Cl.
*H04N 23/55*    (2023.01)
*G02B 3/14*    (2006.01)
(Continued)

(52) U.S. Cl.
CPC ............... *H04N 23/55* (2023.01); *G02B 3/14* (2013.01); *G02B 7/04* (2013.01); *H02M 3/157* (2013.01)

(58) Field of Classification Search
CPC ...... H04N 23/55; H04N 23/685; H04N 23/57; H04N 23/6812; H04N 23/65; G02B 3/14;
(Continued)

(56) References Cited

U.S. PATENT DOCUMENTS 7,126,781 B1 * 10/2006 Bennett ................ G11B 5/5547
360/78.04
7,279,973 B1 * 10/2007 Sevenhans ............ H03F 3/2173
330/251
(Continued)

FOREIGN PATENT DOCUMENTS

CN       101419352 A    4/2009
CN       101458433 A    6/2009
(Continued)

OTHER PUBLICATIONS

International Search Report in International Application No. PCT/KR2019/000896, filed Jan. 22, 2019.
(Continued)

*Primary Examiner* — Quan Pham
(74) *Attorney, Agent, or Firm* — Saliwanchik, Lloyd & Eisenschenk

(57) ABSTRACT

The present invention includes a liquid lens; a voltage control circuit, and a switching unit, wherein the liquid lens includes a first plate comprising a cavity in which a conductive liquid and a non-conductive liquid are disposed; a second plate disposed above the first plate; and a third plate disposed below the first plate, wherein the voltage control circuit includes a first voltage generator configured to output a first voltage; and a DC bias terminal disposed between an output terminal of the first voltage generator and a ground voltage, and wherein the switching unit includes a plurality of first switches configured to transmit one selected from among the first voltage and the ground voltage to the plurality of individual electrodes; and a second switch configured to transmit one selected from among the first voltage and the ground voltage to the common electrode.

17 Claims, 12 Drawing Sheets

(51) Int. Cl.
  *G02B 7/04* (2021.01)
  *H02M 3/157* (2006.01)
(58) Field of Classification Search
  CPC ............ G02B 7/04; G02B 7/021; G02B 7/08;
         H02M 3/157; H02M 3/156; H02M 3/155;
         G02F 1/29; G02F 1/294; G03B 3/00;
         G03B 13/32; G03B 2205/0053; G03B
                     2217/007; G05F 3/205
  See application file for complete search history.

(56) References Cited

U.S. PATENT DOCUMENTS

| | | | |
|---|---|---|---|
| 2008/0204891 A1* | 8/2008 | Tallaron | G02B 3/14 |
| | | | 359/666 |
| 2009/0135484 A1* | 5/2009 | Weber | G02B 26/005 |
| | | | 359/554 |
| 2009/0153208 A1 | 6/2009 | Lynch | |
| 2011/0211262 A1 | 9/2011 | Craen et al. | |
| 2012/0026596 A1 | 2/2012 | Berge et al. | |
| 2014/0247503 A1 | 9/2014 | Bianchi et al. | |
| 2016/0187642 A1 | 6/2016 | Karam et al. | |
| 2018/0183364 A1* | 6/2018 | Lee | H02P 29/027 |

FOREIGN PATENT DOCUMENTS

| | | |
|---|---|---|
| CN | 101556341 A | 10/2009 |
| CN | 102272653 A | 12/2011 |
| EP | 1 906 213 A1 | 4/2008 |
| EP | 2 071 367 A1 | 6/2009 |
| EP | 2 648 031 A1 | 10/2013 |
| JP | 2008-180919 A | 8/2008 |
| JP | 2009-47801 A | 3/2009 |
| KR | 10-2008-0084824 A | 9/2008 |
| KR | 10-2009-0018965 A | 2/2009 |

OTHER PUBLICATIONS

Notice of Allowance dated Feb. 25, 2022 in Chinese Application No. 201980009805.3.
Office Action dated Aug. 30, 2022 in Japanese Application No. 2020-540740.
Supplementary European Search Report dated Aug. 20, 2021 in European Application No. 19744357.5.
Office Action dated Sep. 3, 2021 in Chinese Application No. 201980009805.3.

* cited by examiner

CAMERA MODULE HAVING A LIQUID LENS AND A VOLTAGE CONTROL CIRCUIT

CROSS-REFERENCE TO RELATED APPLICATIONS

This application is the U.S. national stage application of International Patent Application No. PCT/KR2019/000896, filed Jan. 22, 2019, which claims the benefit under 35 U.S.C. § 119 of Korean Application No. 10-2018-0008277, filed Jan. 23, 2018, the disclosures of each of which are incorporated herein by reference in their entirety.

TECHNICAL FIELD

The present disclosure relates to a camera module including a liquid lens. More particularly, the present disclosure relates to a camera module and an optical device, which include a control module or a control device for controlling a liquid lens enabling adjustment of a focal length using electrical energy.

BACKGROUND ART

People who use portable devices demand optical devices that have high resolution, are small, and have various photographing functions (e.g. an optical zoom-in/zoom-out function, an auto-focusing (AF) function, a hand-tremor compensation or optical image stabilizer (OIS) function, etc.). These photographing functions may be realized by directly moving a plurality of lenses that are combined. In the case in which the number of lenses is increased, however, the size of an optical device may be increased. The AF function and the OIS function are performed by moving or tilting several lens modules, which are fixed to a lens holder so as to be aligned with the optical axis, along the optical axis or in a direction perpendicular to the optical axis, and a separate lens-moving apparatus is used to move the lens modules. However, the lens-moving apparatus consumes a lot of power, and a cover glass needs to be provided separately from a camera module in order to protect the lens-moving apparatus, thus leading to an increase in the overall thickness. Therefore, research has been conducted on a liquid lens configured to electrically adjust the curvature of an interface between two types of liquids in order to perform the AF function and the OIS function.

DISCLOSURE

Technical Problem

The present disclosure may reduce, in a portable device equipped with a camera device including a liquid lens, which enables adjustment of a focal length using electrical energy, electromagnetic interference (EMI) caused by radiation noise, which occurs during a process of generating a driving voltage, by decreasing the magnitude of a driving voltage for controlling the state of an interface included in the liquid lens.

In addition, the present disclosure may enable smooth support, in a wireless communication device equipped with a camera device including a liquid lens, of video calls or multitasking using the wireless communication device by decreasing the influence on the transmission/reception sensitivity of an antenna for wireless communication during use of the camera device.

In addition, the present disclosure may reduce the size of a camera module including a liquid lens, thereby making it easier to secure sufficient assembly space when the camera module is mounted in a portable device.

The objects to be accomplished by the disclosure are not limited to the above-mentioned objects, and other objects not mentioned herein will be clearly understood by those skilled in the art from the following description.

Technical Solution

A camera module according to an embodiment of the present disclosure may include a liquid lens and a voltage control circuit. The liquid lens may include a first plate including a cavity in which a conductive liquid and a non-conductive liquid are disposed, a second plate disposed above the first plate, and a third plate disposed below the first plate. The common electrode may be disposed on one side of the first plate, and the plurality of individual electrodes may be disposed on the opposite side of the first plate. The voltage control circuit may include a first voltage generator configured to output a first voltage, and a DC bias terminal disposed between the output terminal of the first voltage generator and a ground voltage. The switching unit may include a plurality of first switches configured to transmit one selected from among the first voltage and the ground voltage to the plurality of individual electrodes, and a second switch configured to transmit one selected from among the first voltage and the ground voltage to the common electrode.

In addition, the first voltage may be applied to the plurality of individual electrodes or the common electrode during a predetermined period of time, and after application of the first voltage, a second voltage that is lower than the first voltage and is higher than the ground voltage may be applied to the plurality of individual electrodes or the common electrode during the predetermined period of time.

In addition, the sum of the first voltage and the second voltage may be 70 V, and the ratio of the first voltage to the second voltage may correspond to the resistance of a resistor included in the DC bias terminal.

In addition, the first voltage may be 40 V, and the second voltage may be 30 V.

In addition, the DC bias terminal may include a resistor disposed between the output terminal of the first voltage generator and the ground voltage.

In addition, the first voltage generator may output the first voltage during the predetermined period of time, and the plurality of first switches or the second switch may connect the plurality of individual electrodes or the common electrode to the first voltage generator during twice the predetermined period of time.

In addition, the camera module may further include a control unit configured to control the first voltage generator, the plurality of first switches, and the second switch. The control unit may output a first control signal to activate the first voltage generator, a plurality of second control signals to activate the plurality of first switches, and a third control signal to activate the second switch.

In addition, the first control signal, the plurality of second control signals, and the third control signal may be pulse width modulation (PWM) signals, and the activation period of the plurality of second control signals and the activation period of the third control signal may be twice as long as the activation period of the first control signal.

In addition, the number of the plurality of individual electrodes, the number of the plurality of first switches, and the number of the plurality of second control signals may be a multiple of four and may be the same as one another.

In addition, the first voltage generator may include a DC-DC converter configured to convert any direct current power into direct current power having the form required by the load.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of a device according to the present disclosure will be described below.

The present disclosure may provide a method and a device capable of reducing radiation noise, which occurs in the process of generating a voltage, by reducing the magnitude of voltage supplied for movement of an interface in a liquid lens.

In addition, the present disclosure may further reduce the size of a camera module by reducing the size of a booster circuit for generating a voltage due to a decrease in the magnitude of voltage for driving a liquid lens.

In addition, the present disclosure may improve the reception sensitivity of an antenna, which may be reduced when a camera module including a liquid lens is applied to a portable device capable of performing a wireless communication function.

The effects achievable through the disclosure are not limited to the above-mentioned effects, and other effects not mentioned herein will be clearly understood by those skilled in the art from the following description.

BEST MODE

Figure 1:
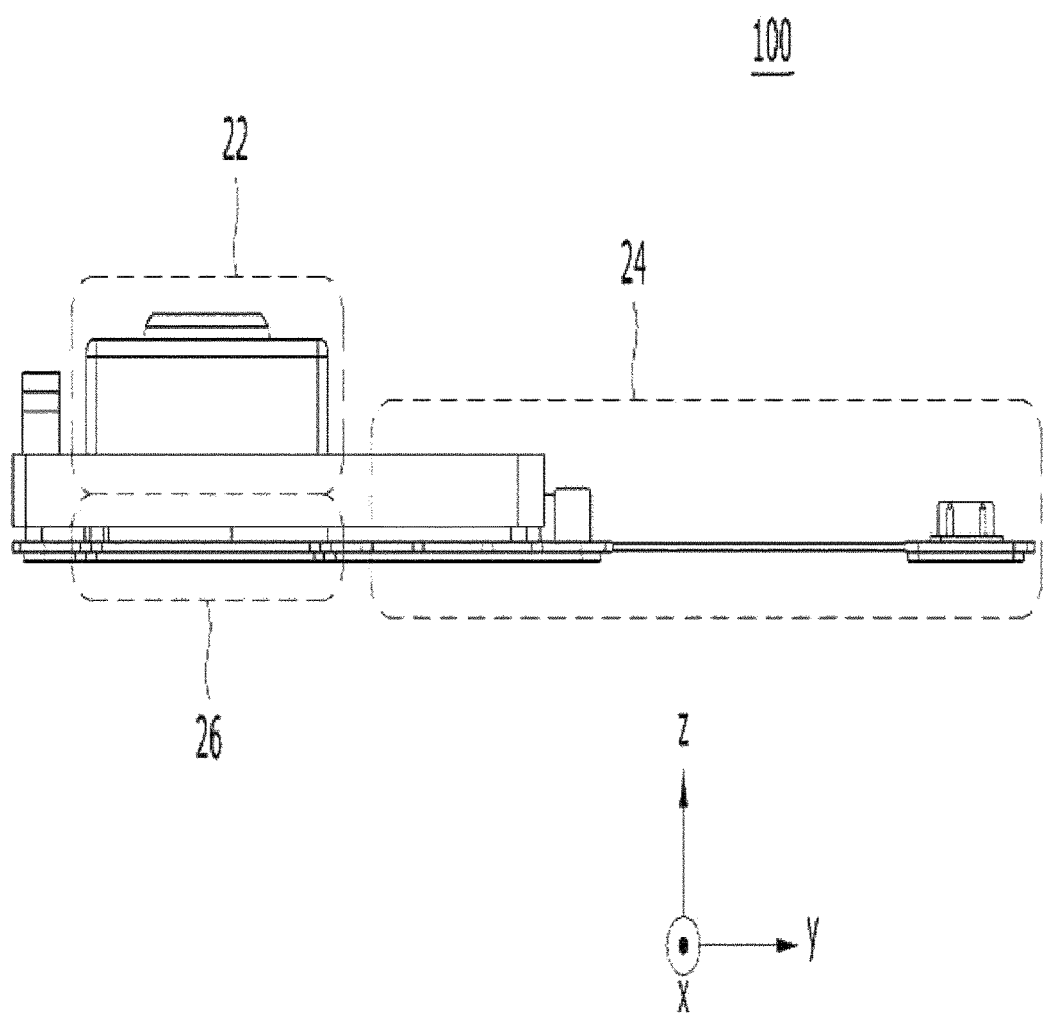
FIG. 1 illustrates a schematic side view of a camera module according to an embodiment.

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

The terms used in the present specification are used for explaining a specific exemplary embodiment, not to limit the present disclosure. Singular expressions include plural expressions unless clearly specified otherwise in context. In the specification, the terms "comprising" or "including" shall be understood to designate the presence of features, numbers, steps, operations, elements, parts, or combinations thereof, but not to preclude the presence or addition of one or more other features, numbers, steps, operations, elements, parts, or combinations thereof.

Unless otherwise defined, all terms including technical and scientific terms used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a lens assembly and a camera module including the same according to embodiments will be described using the Cartesian coordinate system, but the embodiments are not limited thereto. That is, in the Cartesian coordinate system, the x-axis, the y-axis and the z-axis are perpendicular to one another, but the embodiments are not limited thereto. That is, the x-axis, the y-axis, and the z-axis may cross one another, rather than being perpendicular to one another.

Hereinafter, a camera module 100 according to an embodiment will be described with reference to FIGS. 1 to 4.

FIG. 1 illustrates a schematic side view of the camera module 100 according to an embodiment.

Referring to FIG. 1, the camera module 100 may include a lens assembly 22, a control circuit 24, and an image sensor 26.

First, the lens assembly 22 may include a plurality of lens units and a holder in which the plurality of lens units is accommodated. As will be described below, the plurality of lens units may include a liquid lens, and may further include a first lens unit or a second lens unit. Alternatively, the plurality of lens units may include first and second lens units and a liquid lens unit.

The control circuit 24 serves to supply a driving voltage (or an operation voltage) to the liquid lens unit.

The control circuit 24 and the image sensor 26 described above may be disposed on a single printed circuit board (PCB), but this is merely given by way of example, and the embodiment is not limited thereto.

When the camera module 100 according to the embodiment is applied to an optical device (or an optical instrument), the configuration of the control circuit 24 may be designed in different ways depending on the specifications required in the optical device. In particular, the control circuit 24 may be implemented as a single chip so as to reduce the magnitude of the driving voltage applied to the lens assembly 22. Thereby, the size of an optical device mounted in a portable device may be further reduced.

Figure 2:
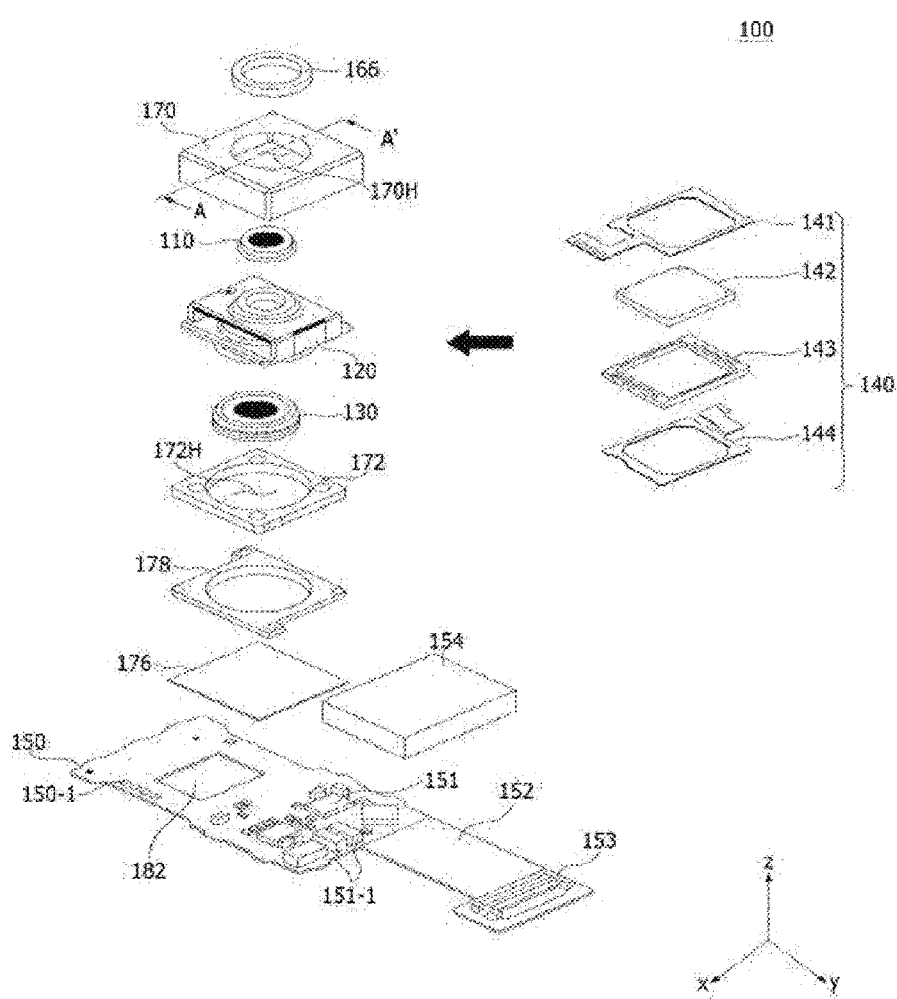
FIG. 2 illustrates an exploded perspective view of an embodiment of the camera module shown in FIG. 1.

FIG. 2 illustrates an exploded perspective view of an embodiment of the camera module 100 shown in FIG. 1.

Referring to FIG. 2, the camera module 100 may include a lens assembly, a main board 150, and an image sensor 182. In addition, the camera module 100 may further include a first cover 170 and a middle base 172. In addition, the camera module 100 may further include at least one adhesive member. The at least one adhesive member serves to couple or fix a liquid lens unit 140 to a holder 120. In addition, the camera module 100 may further include a sensor base 178 and a filter 176, or may not include the sensor base 178 and the filter 176, as shown in FIG. 2. In addition, the camera module 100 may further include a circuit cover 154. The circuit cover 154 may have an electromagnetic shielding function.

In addition, the camera module 100 shown in FIG. 2 may further include a sensor base 178 and a filter 176.

According to the embodiment, at least one of the components 110 to 176 of the camera module 100B shown in FIG. 2 may be omitted. Alternatively, at least one component different from the components 110 to 176 shown in FIG. 2 may be further included in the camera module 100.

Figure 3:
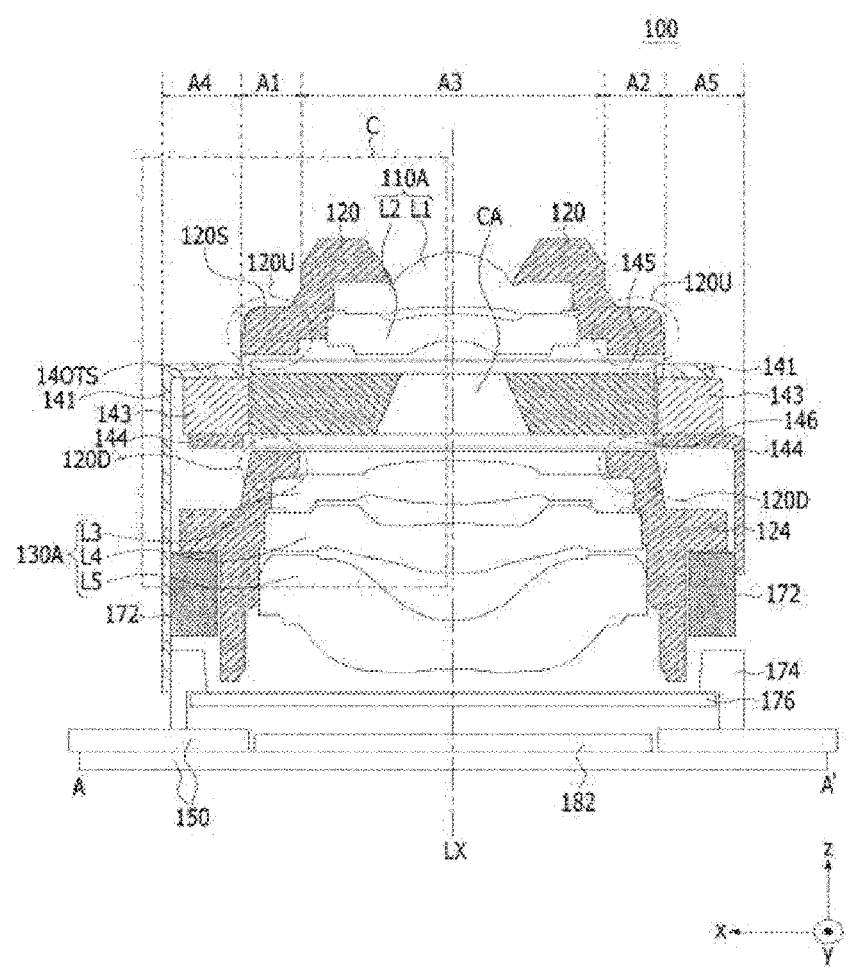
FIG. 3 illustrates a cross-sectional view of the camera module shown in FIG. 2.

FIG. 3 is a cross-sectional view of the camera module 100 shown in FIG. 2. That is, FIG. 3 is a cross-sectional view taken along line A-A' in the camera module 100 shown in FIG. 2. For convenience of description, illustration of the first cover 170, the circuit cover 154, and the connector 153 shown in FIG. 2 is omitted from FIG. 3. In reality, these components may be omitted from the camera module 100.

Referring to FIGS. 2 and 3, the lens assembly may include at least one of the liquid lens unit 140, the holder 120, a first lens unit 110 or 110A, or a second lens unit 130 or 130A, and may correspond to the lens assembly 22 shown in FIG. 1. The lens assembly may be disposed on the main board 150.

In the lens assembly, the first lens unit 110 and the second lens unit 130 may be referred to as a "first solid lens unit" and a "second solid lens unit", respectively, in order to be distinguished from the liquid lens unit 140.

The first lens unit 110 may be disposed at the upper side of the lens assembly, and may be a region on which light is incident from outside the lens assembly. That is, the first lens unit 110 or 110A may be disposed above the liquid lens unit 140 within the holder 120. The first lens unit 110 or 110A may be implemented using a single lens, or may be implemented using two or more lenses that are aligned along a center axis to form an optical system.

Here, the center axis may be an optical axis LX of the optical system, which is formed by the first lens unit 110 or 110A, the liquid lens unit 140, and the second lens unit 130 or 130A included in the camera module 100, or may be an axis parallel to the optical axis LX. The optical axis LX may correspond to the optical axis of the image sensor 182. That is, the first lens unit 110 or 110A, the liquid lens unit 140, the second lens unit 130 or 130A, and the image sensor 182 may be aligned along the optical axis LX through active alignment (AA).

Here, active alignment may mean an operation of aligning the optical axes of the first lens unit 110 or 110A, the second lens unit 130 or 130A, and the liquid lens unit 140 with each other and adjusting an axial relationship or distance relationship between the image sensor 182 and the lens units 110 or 110A, 130 or 130A, and 140 in order to acquire an improved image.

In an embodiment, active alignment may be performed by an operation in which the image sensor 182 generates and analyzes image data when receiving light introduced from a specific object via at least one of the first lens unit 110 or 110A, the second lens unit 130 or 130A, or the liquid lens unit 140. For example, active alignment may be performed in the following sequence.

In one example, after active alignment (first alignment), which adjusts relative positions between the first lens unit 110 or 110A and the second lens unit 130 or 130A, which are fixed and mounted to the holder 120, and the image sensor 182, is completed, active alignment (second alignment), which adjusts relative positions between the liquid lens unit 140, which is inserted into the holder 120, and the image sensor 182, may be performed. First alignment may be performed as a gripper grips the middle base 172 and displaces the middle base 172 to various positions, and second alignment may be performed as the gripper grips a spacer 143 of the liquid lens unit 140 and displaces the spacer to various positions.

However, active alignment may be performed in any other sequence different from the above-described sequence.

Assuming the case in which the middle base 172 is omitted, active alignment may be performed in the state in which the gripper grips a protruding portion 124 of the holder 120. At this time, when the protruding portion 124 has a small thickness, active alignment may not be accurately performed. In order to inhibit this, the camera module 100 may include the middle base 172, which is thicker than the protruding portion 124 of the holder 120. Management of the thickness of the holder 120 may be necessary in order to form the holder 120, which has a complicated shape compared to the shape of the middle base 172, using injection molding or the like. When the thickness of a portion of the holder 120 for active alignment is not sufficient for gripping, the middle base 172 may be added so that active alignment may be performed in the state in which the gripper grips a portion of the middle base 172. However, when the thickness of the protruding portion 124 is sufficiently large, the middle base 172 may be omitted. In addition, the protruding portion 124 and the middle base 172 may be coupled to each other using an adhesive member, for example, epoxy.

In another example, after active alignment (third alignment), which adjusts relative positions between the first lens unit 110 or 110A, the second lens unit 130 or 130A, and the liquid lens unit 140, which are fixed and mounted to the holder 120, is completed, active alignment (fourth alignment), which adjusts relative positions between the lens of the lens assembly, which has completely undergone third alignment, and the image sensor 182 may be performed. Third alignment may be performed as a gripper grips the spacer 143 of the liquid lens unit 140 and displaces the spacer to various positions, and fourth alignment may be performed as the gripper grips the middle base 172 and displaces the middle base to various positions.

In addition, as illustrated in FIG. 3, the first lens unit 110A may include two lenses L1 and L2, but this is merely given by way of example, and the first lens unit 110A may include one lens, or three or more lenses.

In addition, an exposure lens may be disposed at the upper side of the first lens unit 110 or 110A. Here, the exposure lens may be the outermost lens among the lenses included in the first lens unit 110 or 110A. That is, the lens L1 located at the uppermost side of the first lens unit 110A may protrude upwards, and therefore, may function as the exposure lens. The exposure lens faces the risk of damage to the surface thereof since it protrudes outwards from the holder 120. When the surface of the exposure lens is damaged, the quality of an image captured by the camera module 100 may be deteriorated. Therefore, in order to inhibit or minimize damage to the surface of the exposure lens, a cover glass may be disposed, or a coating layer may be formed on the top of the exposure lens. Alternatively, in order to inhibit damage to the surface of the exposure lens, the exposure lens may be formed of a wear-resistant material having higher rigidity than the lenses of the other lens units.

In addition, the outer diameter of each of the lenses L1 and L2 included in the first lens unit 110A may gradually increase with decreasing distance to the bottom (e.g. in the −z-axis direction), but the embodiment is not limited thereto.

Figure 4:
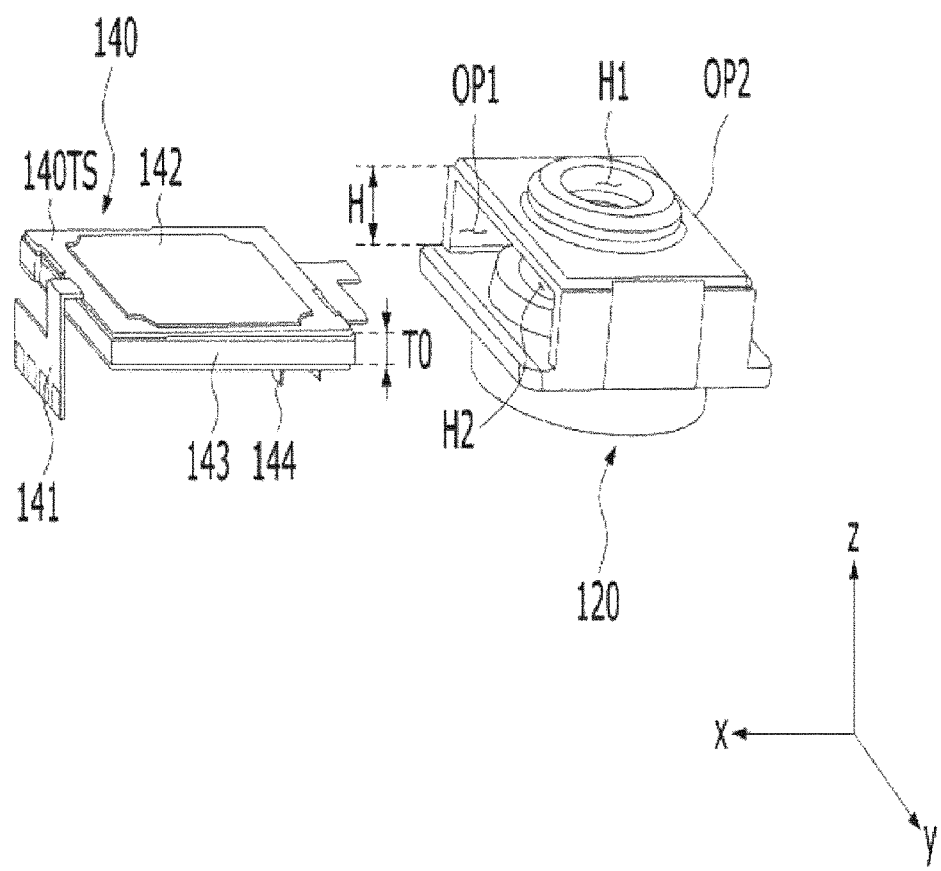
FIG. 4 is a view for explaining the holder and the liquid lens unit shown in FIGS. 1 and 3.

FIG. 4 is a view for explaining the holder 120 and the liquid lens unit 140 shown in FIGS. 2 and 3. That is, FIG. 4 illustrates an exploded perspective view of the holder 120 and the liquid lens unit 140. The holder 120 shown in FIG. 4 may include first and second holes H1 and H2 and first to fourth sidewalls.

FIG. 2 illustrates a plan view of the state before a first connection substrate 141 and a second connection substrate 144 are bent in the −z-axis direction, and FIG. 3 illustrates the state after the first connection substrate 141 and the second connection substrate 144 are bent in the −z-axis direction. Further, as shown in FIG. 3, the spacer 143 may be disposed between the first connection substrate 141 and the second connection substrate 144, and may be disposed so as to protrude from at least one of a first or second opening OP1 or OP2 in the holder 120.

In addition, the spacer 143 may be disposed so as to surround the side surface of the liquid lens 142 in a ring shape. The spacer 143 may include, at the top and the bottom thereof, uneven portions in order to increase coupling force with the connection substrates 141 and 144 using an adhesive material. The connection substrates 141 and 144 may have a shape corresponding to the shape of the spacer 143, and may include a ring shape.

The first and second holes H1 and H2 may be formed respectively in the upper portion and the lower portion of the holder 120 to open the upper portion and the lower portion of the holder 120, respectively. Here, the first hole H1 and the second hole H2 may be through-holes. The first lens unit 110 or 110A may be accommodated in, mounted in, seated in, in contact with, fixed to, provisionally fixed to, supported by, coupled to, or disposed in the first hole H1, which is formed in the holder 120, and the second lens unit 130 or 130A may be accommodated in, mounted in, seated in, in contact with, fixed to, provisionally fixed to, supported by, coupled to, or disposed in the second hole H2, which is formed in the holder 120.

In addition, the first and second sidewalls of the holder 120 may be disposed so as to face each other in a direction perpendicular to the direction of the optical axis LX (e.g. in the x-axis direction), and the third and fourth sidewalls may be disposed so as to face each other in a direction perpendicular to the direction of the optical axis LX (e.g. in the y-axis direction). In addition, as illustrated in FIG. 4, the first sidewall of the holder 120 may include a first opening OP1, and the second sidewall thereof may include a second opening OP2 having a shape that is the same as or similar to that of the first opening OP1. Thus, the first opening OP1 disposed in the first sidewall and the second opening OP2 disposed in the second sidewall may be disposed so as to face each other in a direction perpendicular to the direction of the optical axis LX (e.g. in the x-axis direction).

The inner space in the holder 120, in which the liquid lens unit 140 is disposed, may be open due to the first and second openings OP1 and OP2. In this case, the liquid lens unit 140 may be inserted through the first or second opening OP1 or OP2 so as to be mounted in, seated in, in contact with, fixed to, provisionally fixed to, supported by, coupled to, or disposed in the inner space in the holder 120. For example, the liquid lens unit 140 may be inserted into the inner space in the holder 120 through the first opening OP1.

As such, in order to allow the liquid lens unit 140 to be inserted into the inner space in the holder 120 through the first or second opening OP1 or OP2, the size of the first or second opening OP1 or OP2 in the holder 120 in the direction of the optical axis LX may be greater than the cross-sectional area of the liquid lens unit 140 in the y-axis direction and the z-axis direction. For example, the height H corresponding to the size of each of the first and second openings OP1 and OP2 in the direction of the optical axis LX may be greater than the thickness TO of the liquid lens unit 140.

The second lens unit 130 or 130A may be disposed below the liquid lens unit 140 within the holder 120. The second lens unit 130 or 130A may be spaced apart from the first lens unit 110 or 110A in the optical-axis direction (e.g. in the z-axis direction).

The light introduced into the first lens unit 110 or 110A from outside the camera module 100 may pass through the liquid lens unit 140 and may be introduced into the second lens unit 130 or 130A. The second lens unit 130 or 130A may be implemented using a single lens, or may be implemented using two or more lenses, which are aligned along the center axis to form an optical system. For example, as illustrated in FIG. 3, the second lens unit 130A may include three lenses L3, L4 and L5, but this is merely given by way of example, and two or less lenses or four or more lenses may be included in the second lens unit 130 or 130A.

In addition, the outer diameter of each of the lenses L3, L4 and L5 included in the second lens unit 130A may gradually increase with decreasing distance to the bottom (e.g. in the −z-axis direction), but the embodiment is not limited thereto.

Unlike the liquid lens unit 140, each of the first lens unit 110 or 110A and the second lens unit 130 or 130A may be a solid lens formed of glass or plastic, but the embodiment is not limited as to a specific material of each of the first lens unit 110 or 110A and the second lens unit 130 or 130A.

In addition, referring to FIG. 3, the liquid lens unit 140 may include first to fifth areas A1, A2, A3, A4 and A5.

The first area A1 is an area disposed inside the first opening OP1 in the holder 120, the second area A2 is an area disposed inside the second opening OP2 in the holder 120, and the third area A3 is an area between the first area A1 and the second area A2. The fourth area A4 is an area protruding from the first opening OP1 in the holder 120 and disposed outside the holder 120 at the side of the first opening OP1. The fifth area A5 is an area protruding from the second opening OP2 in the holder 120 and disposed outside the holder 120 at the side of the second opening OP2.

In addition, as shown in FIG. 2, the liquid lens unit 140 may include a first connection substrate (or an individual electrode connection substrate) 141, a liquid lens (or a liquid lens body) 142, the spacer 143, and a second connection substrate (or a common electrode connection substrate) 144.

The first connection substrate 141 may electrically connect a plurality of first electrodes (not shown) included in the liquid lens 142 to the main board 150, and may be disposed above the liquid lens 142. The first connection substrate 141 may be implemented as a flexible printed circuit board (FPCB).

In addition, the first connection substrate 141 may be electrically connected to an electrode pad (not shown), which is formed on the main board 150, via a connection pad (not shown), which is electrically connected to each of a plurality of first electrodes. To this end, after the liquid lens unit 140 is inserted into the inner space of the holder 120, the first connection substrate 141 may be subjected to bending in the −z-axis direction toward the main board 150, and thereafter the connection pad (not shown) and the electrode pad (not shown) may be electrically connected to each other via conductive epoxy. In another embodiment, the first connection substrate 141 may be connected to a first holder surface electrode, which is conductive and is disposed, formed, or coated on the surface of the holder 120, so as to be electrically connected to the main board 150 via the first holder surface electrode, which is conductive and is disposed on the surface of the holder 120, but the embodiment is not limited thereto.

The second connection substrate 144 may electrically connect a second electrode (not shown) included in the liquid lens 142 to the main board 150, and may be disposed below the liquid lens 142. The second connection substrate 144 may be implemented as an FPBC or a single metal substrate (a conductive metal plate). Here, the first and second electrodes will be described later in detail with reference to FIG. 5.

The second connection substrate 144 may be electrically connected to an electrode pad, which is formed on the main board 150, via a connection pad, which is electrically connected to the second electrode. To this end, after the liquid lens unit 140 is inserted into the inner space of the holder 120, the second connection substrate 144 may be subjected to bending in the −z-axis direction toward the main board 150. In another embodiment, the second connection substrate 144 may be connected to a second holder surface electrode, which is conductive and is disposed, formed, or coated on the surface of the holder 120, so as to be electrically connected to the main board 150 via the second holder surface electrode, which is conductive and is disposed on the surface of the holder 120, but the embodiment is not limited thereto.

The liquid lens 142 may include a cavity CA. As shown in FIG. 3, the open area in the direction in which light is introduced into the cavity CA may be smaller than the open area in the opposite direction. Alternatively, the liquid lens 142 may be disposed such that the direction of inclination of the cavity CA is opposite what is illustrated. That is, unlike the illustration of FIG. 3, the open area in the direction in which light is introduced into the cavity CA may be greater than the open area in the opposite direction. In addition, when the liquid lens 142 is disposed such that the direction of inclination of the cavity CA is opposite what is illustrated, the arrangement of all or some of the components included in the liquid lens 142 may be changed, or only the direction of inclination of the cavity CA may be changed and the arrangement of the remaining components may not be changed, according to the direction of inclination of the liquid lens 142. A detailed configuration of the liquid lens 142 will be described later in detail with reference to FIG. 5.

The spacer 143 may be disposed so as to surround the liquid lens 142, and may protect the liquid lens 142 from external impacts. To this end, the spacer 143 may be configured so as to allow the liquid lens 142 to be mounted in, seated in, in contact with, fixed to, provisionally fixed to, supported by, coupled to, or disposed in the spacer.

For example, the spacer 143 may include a hollow region 143H in which the liquid lens 142 is accommodated, and a frame configured to surround the hollow region 143H formed in the center thereof. As such, the spacer 143 may have a centrally-hollowed square planar shape (hereinafter, referred to as a "☐"-shaped form), but the embodiment is not limited thereto.

In addition, the spacer 143 may be disposed between the first connection substrate 141 and the second connection substrate 144, and may be disposed so as to protrude from at least one of the first or second opening OP1 or OP2 in the holder 120. That is, at least a portion of the spacer 143 may be shaped so as to protrude, along with the first and second connection substrates 141 and 144, from at least one of the first or second sidewall of the holder 120 in the direction perpendicular to the optical axis LX (e.g. in the x-axis direction). This is because the length of the spacer 143 in the x-axis direction is greater than the length of the holder 120 in the x-axis direction. Thus, portions of the spacer 143, which protrude from the first and second sidewalls, may respectively correspond to the fourth area A4 and the fifth area A5 shown in FIG. 3.

In addition, the spacer 143 may be brought into contact with a gripper when the spacer 143 is inserted into the holder 120 and during active alignment.

In addition, at least a portion of the spacer 143 may be disposed in at least one of the first opening OP1 or the second opening OP2. In the case of FIG. 3, the spacer 143 is illustrated as not being disposed in the first opening OP1 and the second opening OP2. However, unlike the illustration, as illustrated in FIGS. 2 and 4, it can be appreciated that at least a portion of the spacer 143 may be disposed in each of the first and second openings OP1 and OP2 since the spacer 143 has a "☐"-shaped form and surrounds the liquid lens 142.

In addition, at least a portion of the liquid lens 142 may be disposed in at least one of the first opening OP1 or the second opening OP2. Referring to FIG. 3, it can be appreciated that a first plate 147 of the liquid lens 142, which is a component of the liquid lens 142, is disposed in each of the first and second openings OP1 and OP2.

In addition, only at least a portion of the spacer 143 may be disposed in each of the first and second openings OP1 and OP2, and the liquid lens 142 may not be disposed therein.

In addition, referring to FIG. 3, the holder 120 may include a holder upper area 120U disposed above the liquid lens unit 140 and a holder lower area 120D disposed below the liquid lens unit 140. In this case, each of the first and second adhesive members (not shown) may couple each of the holder upper area 120U and the holder lower area 120D to the liquid lens unit 140.

The first cover 170 may be disposed so as to surround the holder 120, the liquid lens unit 140, and the middle base 172, and may protect these 120, 140 and 172 from external impacts. In particular, when the first cover 170 is disposed, a plurality of lenses, which forms an optical system, may be protected from external impacts.

In addition, in order to allow the first lens unit 110 or 110A disposed in the holder 120 to be exposed to external light, the first cover 170 may include an upper opening 170H formed in the top surface of the first cover 170.

In addition, a window formed of a light-transmitting material may be disposed in the upper opening 170H. This may inhibit foreign substances such as dust or moisture from entering the camera module 100.

In addition, the first cover 170 may be disposed so as to cover the top surface of the holder 120 and the first to fourth sidewalls.

Meanwhile, referring to FIGS. 2 and 3, the middle base 172 may be disposed so as to surround the second hole H2 in the holder 120. To this end, the middle base 172 may include an accommodating hole 172H for accommodating the second hole H2 therein. The inner diameter of the middle base 172 (i.e. the diameter of the accommodating hole 172H) may be equal to or greater than the outer diameter of the second hole H2.

Here, each of the accommodating hole 172H in the middle base 172 and the second hole H2 is illustrated as having a circular shape, but the embodiment is not limited thereto, and these holes may be changed to various other shapes.

In the same manner as the upper opening 170H in the first cover 170, the accommodating hole 172H may be formed near the center of the middle base 172 at a position corresponding to the position of the image sensor 182, which is disposed in the camera module 100.

The middle base 172 may be mounted on the main board 150 so as to be spaced apart from a circuit element 151 on the main board 150. That is, the holder 120 may be disposed on the main board 150 so as to be spaced apart from the circuit element 151.

The main board 150 may be disposed below the middle base 172, and may include a recess in which the image sensor 182 may be mounted, seated, tightly disposed, fixed, provisionally fixed, supported, coupled, or accommodated, the circuit element 151, a connection portion (or an FPCB) 152, and a connector 153.

The circuit element 151 of the main board 150 may constitute a control module, which controls the liquid lens unit 140 and the image sensor 182. Here, the circuit element 151 may include at least one of a passive element or an active element, and may have any of various areas and heights. The circuit element 151 may be provided in a plural number, and may have a height greater than the height of the main board 150 so as to protrude outwards. The plurality of circuit elements 151 may be disposed so as not to overlap the holder 120 in the direction parallel to the optical axis LX. For example, the plurality of circuit elements 151 may include a power inductor, a gyro sensor, and the like, but the embodiment is not limited as to a specific type of the circuit elements 151.

The main board 150 may include a holder area in which the holder 120 is disposed and an element area in which the plurality of circuit elements 151 is disposed.

The main board 150 may be implemented as a rigid flexible printed circuit board (RFPCB) including the FPCB 152. The FPCB 152 may be subjected to bending based on the requirement of the space in which the camera module 100 is mounted.

The image sensor 182 may perform a function of converting the light that has passed through the first lens unit 110, the liquid lens unit 140, and the second lens unit 130 of the lens assembly 110, 120, 130 and 140 into image data. More specifically, the image sensor 182 may generate image data by converting light into analog signals via a pixel array including a plurality of pixels and synthesizing digital signals corresponding to the analog signals.

Meanwhile, the connector 153 may electrically connect the main board 150 to a power supply or any other device (e.g. an application processor) outside the camera module 100.

Hereinafter, an embodiment of a method of manufacturing the camera module 100 will be described with reference to the accompanying drawings.

First, the image sensor 182 may be mounted on the main board 150, and the holder 120 which is coupled or disposed to the middle base 172 may be mounted on, seated on, in contact with, provisionally fixed to, supported by, coupled to, or disposed on the main board 150.

At this time, active alignment (first alignment) between the first lens unit 110 or 110A and the second lens unit 130 or 130A, which are mounted in the holder 120, and the image sensor 182 may be performed. First alignment may be performed by adjusting the positions of the middle base 172 and the holder 120 while supporting opposite sides of the middle base 172. First alignment may be performed while moving a jig, which presses and fixes opposite sides of the middle base 172. The middle base 172 may be fixed to the main board 150 in the completed state of first alignment.

Subsequently, the liquid lens unit 140 may be inserted into the holder 120 through at least one of the first opening OP1 or the second opening OP2 in the holder 120, and active alignment between the liquid lens unit 140 and the image sensor 182 may be performed as second alignment. Second alignment may be performed by adjusting the position of the liquid lens unit 140 while supporting the liquid lens unit 140 in the x-axis direction. Second alignment may be performed while moving a jig, which presses and fixes the liquid lens unit 140 in the x-axis direction.

Subsequently, each of the first connection substrate 141 and the second connection substrate 144 may be subjected to bending so as to be electrically connected to the main board 150. After the bending process, a soldering process is performed for electrical connection between each of the first connection substrate 141 and the second connection substrate 144 and the main board 150.

Subsequently, the first lens unit 110, the holder 120, the second lens unit 130, the liquid lens unit 140, and the middle base 172 are covered with the first cover 170 so as to complete the camera module 100.

Meanwhile, some of the plurality of circuit elements 151 shown in FIG. 2 may cause electromagnetic interference (EMI) or noise. In particular, among the plurality of circuit elements 151, a power inductor 151-1 may cause greater EMI than other elements. In order to block EMI or noise, the circuit cover 154 may be disposed so as to cover the circuit elements 151 disposed in the element area of the main board 150.

In addition, when the circuit cover 154 is disposed so as to cover the circuit elements 151, the circuit elements 151 disposed on the main board 150 may be protected from external impacts. To this end, the circuit cover 154 may include an accommodating space for accommodating therein and covering the circuit elements 151, in consideration of the shape and position of the circuit elements 151 disposed on the main board 150.

Meanwhile, the filter 176 may filter light within a specific wavelength range, among the light that has passed through the first lens unit 110 or 110A, the liquid lens unit 140, and the second lens unit 130 or 130A. The filter 176 may be an infrared (IR) light blocking filter or an ultraviolet (UV) light blocking filter, but the embodiment is not limited thereto. The filter 176 may be disposed above the image sensor 182. The filter 176 may be disposed inside the sensor base 178. For example, the filter 176 may be disposed or mounted in an inner recess in the sensor base 178 or on a stepped portion thereof.

The sensor base 178 may be disposed below the middle base 172, and may be attached to the main board 150. The sensor base 178 may surround the image sensor 182, and may protect the image sensor 182 from foreign substances or external impacts.

The main board 150 may be disposed below the sensor base 178. The sensor base 178 may be mounted on the main board 150 so as to be spaced apart from the circuit elements 151, and the holder 120 in which the middle base 172, the second lens unit 130 or 130A, the liquid lens unit 140, and the first lens unit 110 or 110A are disposed may be disposed above the sensor base 178.

In addition, the camera module 100 shown in FIG. 2 may not include the sensor base 178 and the filter 176.

Figure 5:
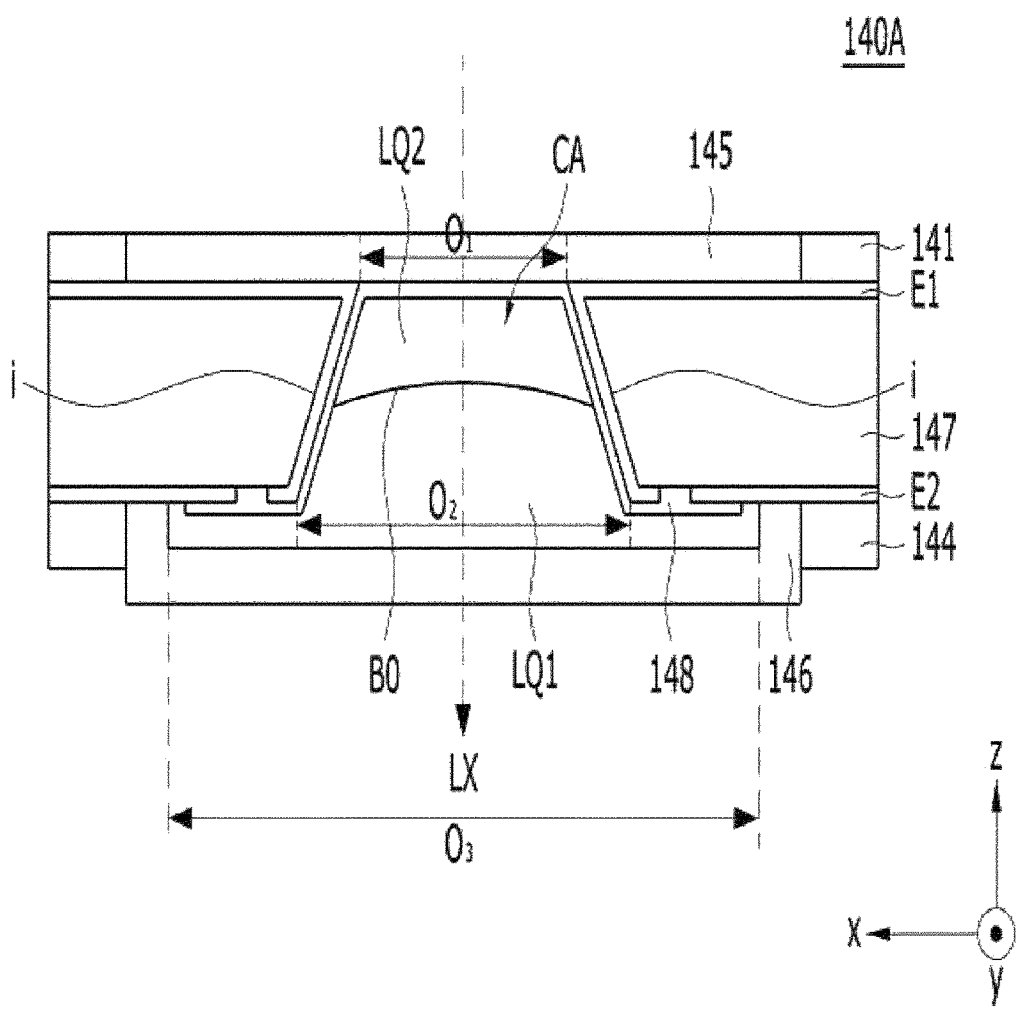
FIG. 5 illustrates a cross-sectional view of an embodiment of the liquid lens unit including the liquid lens according to the embodiment described above.

Hereinafter, an embodiment 140A of the liquid lens unit 140 included in the camera module 100 according to the embodiment described above will be described with reference to FIG. 5. FIG. 5 illustrates a cross-sectional view of the embodiment 140A of the liquid lens unit 140 including the liquid lens according to the embodiment described above.

Each of the liquid lens unit 140A shown in FIG. 5 may include the first connection substrate 141, the liquid lens 142, the spacer 143, and the second connection substrate 144. The spacer 143 has been described above, and thus a duplicate description thereof will be omitted. For convenience of description, illustration of the spacer 143 is omitted from FIG. 5.

The liquid lens 142 may include a plurality of different types of liquids LQ1 and LQ2, first to third plates 147, 145 and 146, first and second electrodes E1 and E2, and an insulation layer 148. The liquid lens 142 may further include an optical layer (not shown).

The liquids LQ1 and LQ2 may be accommodated in the cavity CA, and may include a first liquid LQ1, which is conductive, and a second liquid (or an insulative liquid) LQ2, which is non-conductive. The first liquid LQ1 and the second liquid LQ2 may not mix with each other, and an interface BO may be formed on a contact portion between the first and second liquids LQ1 and LQ2. For example, the second liquid LQ2 may be disposed above the first liquid LQ1, but the embodiment is not limited thereto.

In addition, in the cross-sectional shape of the liquid lens 142, the edge of the first and second liquids LQ2 and LQ1 may be thinner than the center portion thereof.

The second liquid LQ2 may be oil, and for example, may be phenyl-based silicon oil. The first liquid LQ1 may be formed by mixing, for example, ethylene glycol and sodium bromide (NaBr).

Each of the first liquid LQ1 and the second liquid LQ2 may include at least one of a sterilizer or an antioxidant. The antioxidant may be a phenyl-based antioxidant or a phosphorus (P)-based antioxidant. In addition, the sterilizer may be any one of alcohol-based, aldehyde-based, and phenol-based sterilizers. When each of the first liquid LQ1 and the second liquid LQ2 includes the antioxidant and the sterilizer, it is possible to inhibit a change in the physical properties of the first and second liquids LQ1 and LQ2 due to oxidation of the first and second liquids LQ1 and LQ2 or the propagation of microorganisms.

The inner side surface of the first plate 147 may form a sidewall i of the cavity CA. The first plate 147 may include upper and lower openings having a predetermined inclined surface. That is, the cavity CA may be defined as an area that is surrounded by the inclined surface of the first plate 147, a third opening in contact with the second plate 145, and a fourth opening in contact with the third plate 146.

The diameter of a wider opening among the third and fourth openings may be changed depending on the field of view (FOV) required for the liquid lens 142 or the role of the liquid lens 142 in the camera module 100. According to the embodiment, the size (the area or the width) of the fourth opening $O_2$ may be greater than the size (the area or the width) of the third opening $O_1$. Here, the size of each of the third and fourth openings may be the cross-sectional area in the horizontal direction (e.g. the x-axis direction and the y-axis direction). For example, the size of each of the third and fourth openings may mean the radius when the opening has a circular cross-section, and may mean the diagonal length when the opening has a square cross-section.

Each of the third and fourth openings may take the form of a hole having a circular cross-section, and the inclined surface thereof may have an inclination angle ranging from 55° to 65° or an inclination angle ranging from 50° to 70°. The interface BO formed by the two liquids may be moved along the inclined surface of the cavity CA by a driving voltage.

The first liquid LQ1 and the second liquid LQ2 are charged, accommodated, or disposed in the cavity CA in the first plate 147. In addition, the cavity CA is the area through which the light that has passed through the first lens unit 110 or 110A passes. Thus, the first plate 147 may be formed of a transparent material, and may include impurities so that light does not easily pass therethrough.

The electrodes may be disposed respectively on one surface and the other surface of the first plate 147. A plurality of first electrodes E1 may be disposed on one surface (e.g. the top surface, the side surface, or the bottom surface) of the first plate 147 so as to be spaced apart from the second electrode E2. The second electrode E2 may be disposed on at least an area of the other surface (e.g. the bottom surface) of the first plate 147 and may be in direct contact with the first liquid LQ1.

In addition, the first electrodes E1 may be "n" electrodes (hereinafter, referred to as "individual electrodes"), and the second electrode E2 may be a single electrode (hereinafter, referred to as a "common electrode"). Here, "n" may be an integer of 2 or greater.

Each of the first and second electrodes E1 and E2 may include at least one electrode sector. For example, the first electrode E1 may include two or more electrode sectors, and the second electrode E2 may include at least one electrode sector. For example, the plurality of first electrodes E1 may include a plurality of electrode sectors sequentially disposed in the clockwise direction (or in the counterclockwise direction) about the optical axis. Here, the electrode sector means a portion of the electrode.

A portion of the second electrode E2 (i.e. an electrode sector of the second electrode E2) disposed on the other surface of the first plate 147 may be exposed to the first liquid LQ1, which is conductive.

Each of the first and second electrodes E1 and E2 may be formed of a conductive material, e.g. metal, and specifically, may include chrome (Cr). Chromium or chrome is a glossy silver rigid transition metal, which is fragile, does not readily discolor, and has a high melting point. In addition, since an alloy including chromium exhibits high corrosion resistance and rigidity, chromium may be used in the form of being alloyed with other metals. In particular, since chrome (Cr) is not easily corroded or discolored, chrome exhibits high resistance to the first liquid LQ1, which is conductive and is charged in the cavity CA.

In addition, the second plate 145 may be disposed on one surface of the first electrodes E1. That is, the second plate 145 may be disposed above the first plate 147. Specifically, the second plate 145 may be disposed above the top surface of the first electrodes E1 and the cavity CA.

The third plate 146 may be disposed on one surface of the second electrode E2. That is, the third plate 146 may be disposed below the first plate 147. Specifically, the third plate 146 may be disposed below the bottom surface of the second electrode E2 and the cavity CA.

The second plate 145 and the third plate 146 may be disposed so as to face each other, with the first plate 147 interposed therebetween. In addition, at least one of the second plate 145 or the third plate 146 may be omitted.

At least one of the second or third plate 145 or 146 may have a rectangular planar shape. The third plate 146 may be brought into contact with and bonded to the first plate 147 on a bonding area thereof around the edge.

Each of the second and third plates 145 and 146 may be an area through which light passes, and may be formed of a light-transmitting material. For example, each of the second and third plates 145 and 146 may be formed of glass, and for convenience of processing, may be formed of the same material. In addition, the edge of each of the second and third plates 145 and 146 may have a rectangular shape, without being necessarily limited thereto.

The second plate 145 may be configured so as to allow the light introduced into the first lens unit 110 or 110A to travel into the cavity CA in the first plate 147.

The third plate 146 may be configured so as to allow the light that has passed through the cavity CA in the first plate 147 to travel to the second lens unit 130 or 130A. The third plate 146 may be in direct contact with the first liquid LQ1.

According to the embodiment, the third plate 146 may have a diameter greater than the diameter of a wider opening among the third and fourth openings in the first plate 147. In addition, the third plate 146 may include a peripheral area spaced apart from the first plate 147.

In addition, the actual effective lens area of the liquid lens 142 may be narrower than the diameter (e.g. $O_2$) of a wider opening among the third and fourth openings in the first plate 147. For example, when a region within a small radius about the center of the liquid lens 142 is used as an actual light transmission path, the diameter (e.g. $O_3$) of the center area of the third plate 146 may be smaller than the diameter (e.g. $O_2$) of a wider opening among the third and fourth openings in the first plate 147.

The insulation layer 148 may be disposed so as to cover a portion of the bottom surface of the second plate 145 in the upper area of the cavity CA. That is, the insulation layer 148 may be disposed between the second liquid LQ2 and the second plate 145.

In addition, the insulation layer 148 may be disposed so as to cover a portion of the first electrode E1, which forms the sidewall of the cavity CA. In addition, the insulation layer 148 may be disposed on the bottom surface of the first plate 147 so as to cover a portion of the first electrode E1, the first plate 147, and a portion of the second electrode E2. Thus, contact between the first electrode E1 and the first liquid LQ1 and contact between the first electrode E1 and the second liquid LQ2 may be inhibited by the insulation layer 148.

The insulation layer 148 may be formed of, for example, a coating agent such as parylene C, and may further include a white dye. The white dye may increase the rate of reflection of light from the insulation layer 148, which forms the sidewall i of the cavity CA.

The insulation layer 148 may cover one electrode among the first and second electrodes E1 and E2 (e.g. the first electrode E1), and may expose a portion of the other electrode (e.g. the second electrode E2) so that electrical energy is applied to the first liquid LQ1 having conductivity.

In the case of the camera module 100 according to the embodiment, the filter 176 for the blocking of ultraviolet light or infrared light is disposed between the middle base 172 and the image sensor 182, and filters light within a specific wavelength range, among the light that has passed through the first lens unit 110, the liquid lens 142, and the second lens unit 130. In addition, such an infrared light blocking filter or an ultraviolet light blocking filter is mounted in a recess in the sensor base 178.

At least one substrate, for example, the first connection substrate 141 and the second connection substrate 144 serves to supply a voltage to the liquid lens 142. To this end, the plurality of first electrodes E1 may be electrically connected to the first connection substrate 141, and the second electrode E2 may be electrically connected to the second connection substrate 144.

When a driving voltage is applied to the first and second electrodes E1 and E2 through the first connection substrate 141 and the second connection substrate 144, the interface BO between the first liquid LQ1 and the second liquid LQ2 may be deformed, and thus at least one of the shape, such as a curvature, or the focal length of the liquid lens 142 may be changed (or adjusted). For example, the focal length of the liquid lens 142 may be adjusted as at least one of the flexure or the inclination of the interface BO formed in the liquid lens 142 is changed according to the driving voltage. When the deformation or the radius of curvature of the interface BO is controlled, the liquid lens 142, the lens assembly 110, 120, 130 and 140 including the liquid lens 142, the camera module 100, and the optical device may perform an autofocusing (AF) function and a hand-tremor compensation or optical image stabilizer (OIS) function.

The first connection substrate 141 may transmit four different driving voltages (hereinafter, referred to as "individual voltages") to the liquid lens 142, and the second connection substrate 144 may transmit one driving voltage (hereinafter, referred to as a "common voltage") to the liquid lens 142. The common voltage may include a DC voltage or an AC voltage. When the common voltage is applied in a pulse form, the pulse width or the duty cycle may be constant. The individual voltages supplied via the first connection substrate 141 may be applied to the plurality of first electrodes E1 (or the plurality of electrode sectors) exposed at the respective corners of the liquid lens 142.

Although not illustrated, when conductive epoxy is disposed between the first connection substrate 141 and the plurality of first electrodes E1, the first connection substrate 141 and the plurality of first electrodes E1 may be in contact with each other, may be coupled to each other, and may be in electrical conduction with each other. In addition, when conductive epoxy is disposed between the second connection substrate 144 and the second electrode E2, the second connection substrate 144 and the second electrode E2 may be in contact with each other, may be coupled to each other, and may be in electrical conduction with each other.

In addition, the first connection substrate 141 and the plurality of first electrodes E1 may be implemented as separate elements, or may be integrally formed. In addition, the second connection substrate 144 and the second electrode E2 may be implemented as separate elements, or may be integrally formed.

Figure 6:
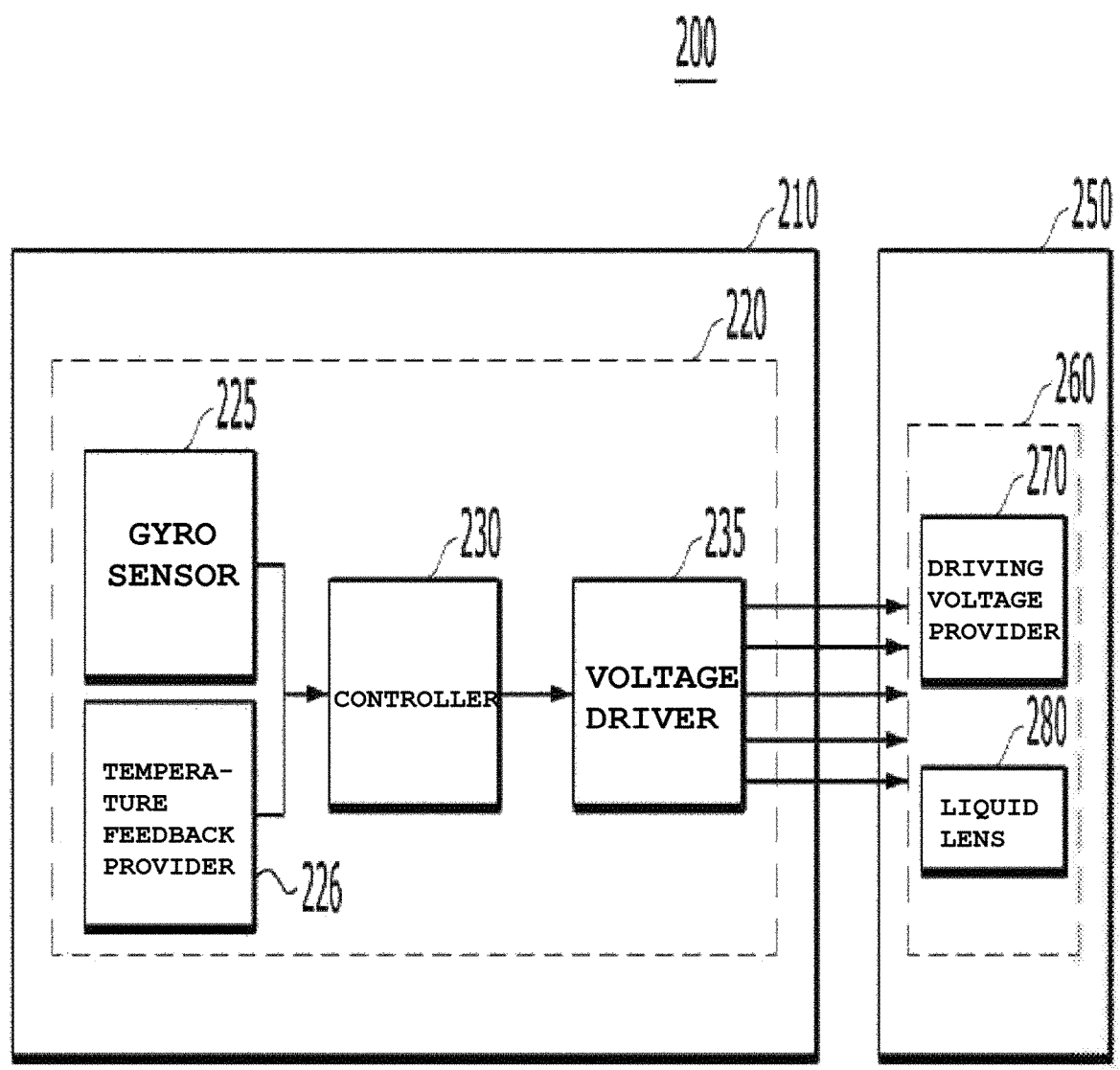
FIG. 6 is a schematic block diagram of the camera module.

FIG. 6 is a schematic block diagram of the camera module 200.

Referring to FIG. 6, the camera module 200 may include a control circuit 210 and a lens assembly 250. The control circuit 210 may correspond to the control circuit 24 shown in FIG. 1, and the lens assembly 250 may correspond to the lens assembly 22 shown in FIG. 1 or the lens assembly 110, 120, 130 and 140 shown in FIG. 2.

The control circuit 210 may include a control unit 220, and may control the operation of the liquid lens unit 140 including a liquid lens 280.

The control unit 220 may have a component for performing an AF function and an OIS function, and may control the liquid lens 280 included in the lens assembly 250 using a user request or a sensed result (e.g. a motion signal of a gyro sensor 225). Here, the liquid lens 280 may correspond to the above-described liquid lens 142.

The control unit 220 may include a gyro sensor 225, a controller 230, and a voltage driver 235. The gyro sensor 225 may be an independent component that is not included in the control unit 220, or may be included in the control unit 220.

The gyro sensor 225 may sense the angular velocity of movement in two directions, including a yaw-axis direction and a pitch-axis direction, in order to compensate for hand tremor in the vertical and horizontal directions of the optical device. The gyro sensor 225 may generate a motion signal corresponding to the sensed angular velocity, and may provide the motion signal to the controller 230.

The controller 230 may remove a high frequency noise component from the motion signal using a low-pass filter (LPF) so as to extract only a desired frequency band for implementation of an OIS function, may calculate the amount of hand tremor using the motion signal from which the noise has been removed, and may calculate a driving voltage corresponding to the shape that the liquid lens 280 of the liquid lens module 260 needs to have in order to compensate for the calculated amount of hand tremor.

The controller 230 may receive information for an AF function (i.e. information on the distance to an object) from an internal component (e.g. an image sensor 182) or an external component (e.g. a distance sensor or an application processor) of the optical device or the camera module 200, and may calculate the driving voltage corresponding to the desired shape of the liquid lens 280 based on a focal length, which is required to focus on the object, using the distance information.

The controller 230 may store a driving voltage table in which a driving voltage and a driving voltage code for making the voltage driver 235 generate the driving voltage are mapped, may acquire the driving voltage code corresponding to the calculated driving voltage by referring to the driving voltage table, and may output the acquired driving voltage code to the voltage driver 235.

The voltage driver 235 may generate a driving voltage in an analog form, which corresponds to the driving voltage code, based on a driving voltage code in a digital form provided from the controller 230, and may provide the driving voltage to the lens assembly 250.

The voltage driver 235 may include a voltage booster, which increases a voltage level upon receiving a supply voltage (e.g. a voltage supplied from a separate power supply circuit), a voltage stabilizer for stabilizing the output of the voltage booster, and a switching unit for selectively supplying the output of the voltage booster to each terminal of the liquid lens 280.

Here, the switching unit may include a circuit component called an H bridge. A high voltage output from the voltage booster is applied as a power supply voltage of the switching unit. The switching unit may selectively supply the applied power supply voltage and a ground voltage to opposite ends of the liquid lens 280. Here, the liquid lens 280 may include the four first electrodes E1 including four electrode sectors, the first connection substrate 141, the second electrode E2, and the second connection substrate 144 for driving. Opposite ends of the liquid lens 280 may mean any one of the plurality of first electrodes E1 and the second electrode E2. In addition, opposite ends of the liquid lens 280 may mean any one of the four electrode sectors of the four first electrodes E1 and one electrode sector of the second electrode E2.

A pulse-type voltage having a predetermined width may be applied to each electrode sector of the liquid lens 280, and the driving voltage applied to the liquid lens 280 is the difference between the voltages applied to each of the first electrodes E1 and the second electrode E2.

In addition, in order to allow the voltage driver 235 to control the driving voltage applied to the liquid lens 280 depending on a driving voltage code in a digital form provided from the controller 230, the voltage booster may control an increase in a voltage level, and the switching unit may control the phase of a pulse voltage applied to the common electrode and the individual electrodes so as to generate a driving voltage in an analog form, which corresponds to the driving voltage code.

That is, the control unit 220 may control the voltage applied to each of the first electrodes E1 and the second electrode E2.

The control circuit 210 may further include a connector (not shown), which performs a communication or interface function of the control circuit 210. For example, the connector may perform communication protocol conversion for communication between the control circuit 210, which uses an inter-integrated circuit ($I^2C$) communication method, and the lens assembly 250, which uses a mobile industry processor interface (MIPI) communication method. In addition, the connector may receive power from an external source (e.g. a battery), and may supply power required for the operation of the control unit 220 and the lens assembly 250. In this case, the connector may correspond to the connector 153 shown in FIG. 2.

The lens assembly 250 may include the liquid lens module 260, and the liquid lens module 260 may include a driving voltage provider 270 and the liquid lens 280.

The driving voltage provider 270 may receive a driving voltage from the voltage driver 235, and may provide the driving voltage to the liquid lens 280. Here, the driving voltage may be an analog voltage applied between any one of the "n" individual electrodes and one common electrode.

The driving voltage provider 270 may include a voltage adjustment circuit (not shown) or a noise removal circuit (not shown) for compensating for loss due to terminal connection between the control circuit 210 and the lens assembly 250, or may divert the voltage provided from the voltage driver 235 to the liquid lens 280.

The driving voltage provider 270 may be disposed on an FPCB (or a substrate), which constitutes at least a portion of the connection part 152, but the embodiment is not limited thereto. The connection part 152 may include the driving voltage provider 270.

The liquid lens 280 may be deformed in the interface BO thereof between the first liquid LQ1 and the second liquid LQ2 depending on a driving voltage, thereby performing at least one of an AF function or an OIS function.

FIGS. 7(a) and (b) are views for explaining the liquid lens 142, the interface of which is adjusted to correspond to a driving voltage. Specifically, FIG. 7(a) illustrates a perspective view of the liquid lens 142 according to the embodiment, and FIG. 7(b) illustrates an equivalent circuit of the liquid lens 142. Here, the liquid lens 142 is the same as the liquid lens 142 of FIG. 2, and thus is designated by the same reference numeral.

First, referring to FIG. 7(a), the liquid lens 142, the interface BO of which is adjusted in shape to correspond to a driving voltage, may receive the driving voltage via a plurality of electrode sectors E11, E12, E13 and E14 of the plurality of first electrodes E1, which are disposed in four different directions to have the same angular distance therebetween, and an electrode sector CO of the second electrode E2. When the driving voltage is applied via any one of the plurality of electrode sectors E11, E12, E13 and E14 of the plurality of first electrodes E1 and the electrode sector CO of the second electrode E2, the shape of the interface BO between the first liquid LQ1 and the second liquid LQ2, which are disposed in the cavity CA, may be deformed. The degree of deformation and the shape of the interface BO between the first liquid LQ1 and the second liquid LQ2 may be controlled by the controller 230 in order to implement at least one of an AF function or an OIS function.

In addition, referring to FIG. 7(b), the liquid lens 142 may be explained as a plurality of capacitors CAP, in which one side of the lens 142 receives a voltage from the different electrode sectors E11, E12, E13 and E14 of the first electrodes E1, and the other side of the lens 142 is connected to the electrode sector CO of the second electrode E2 so as to receive a voltage therefrom.

In FIG. 7(a), the number of different electrode sectors E11, E12, E13 and E14 included in the plurality of first electrodes E1 is illustrated as being four, but the embodiment is not limited thereto.

Here, the two electrodes E1 and E2 are divided into a second electrode E2, which is exposed to the conductive liquid LQ1, and a first electrode E1, which is not exposed to the conductive liquid LQ1. Referring to FIGS. 7(a) and 4, the second electrode E2, which is exposed to the conductive liquid LQ1, may be connected to the common terminal CO, and the first electrode E1, which is not exposed to the conductive liquid LQ1, may be connected to different individual terminals L1, L2, L3 and L4. The first electrode E1, which is connected to the different individual terminals L1, L2, L3 and L4, may be divided into multiple segments, which are electrically and physically separated from each other.

Meanwhile, according to an embodiment, the area of the second electrode E2 and the area of the first electrode E1 may be substantially the same. Here, the area of the first electrode E1 may be equal to the sum of the areas of the multiple segments. Further, all of the multiple segments included in the first electrode E1 may have substantially the same area as each other.

The electrical characteristics of the liquid lens 142 described with reference to FIGS. 7(a) and 5 may be explained as those of multiple unit capacitors, which are divided and connected in parallel on the basis of multiple segments included in the first electrode E1, as described with reference to FIG. 7(b). Further, the electrical characteristics of the liquid lens 142 may be explained as those of a single capacitor on the basis of the second electrode E2 and the first electrode E1 thereof. In the case in which the area of the second electrode E2 and the area of the first electrode E1 are substantially the same, when the liquid lens 142 is regarded as one capacitor, this may mean that the areas of the two electrodes of the capacitor are substantially the same. Further, when all of the multiple segments included in the first electrode E1 have substantially the same area, this may mean that the capacitances of the unit capacitors, which are connected in parallel, are substantially the same in the same environment or conditions. In this case, the electrical characteristics of the liquid lens 142, which may be described as those of a capacitor, may be more clearly specified, thereby enabling more precise and accurate control of the liquid lens 142 and reduced control error. This results in improved operational stability and performance of the liquid lens 142.

Figure 8:
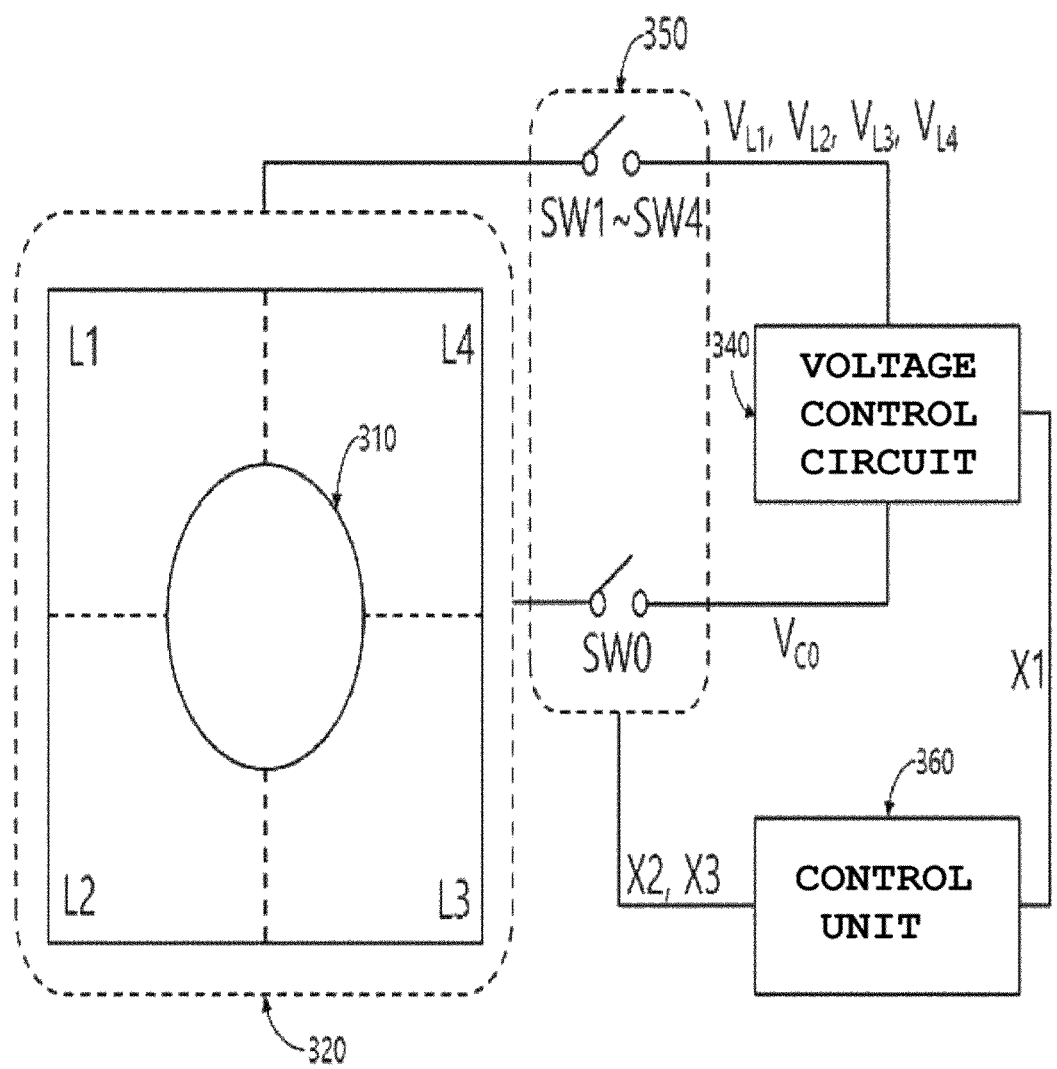
FIG. 8 is a schematic block diagram of a camera module for EMI improvement.

FIG. 8 is a schematic block diagram of a camera module for EMI improvement.

As illustrated, the camera module may include a voltage control circuit 340 for generating voltages $V_{L1}$, $V_{L2}$, $V_{L3}$, $V_{L4}$, and $V_{CO}$, for inducing movement of the interface 310 in the liquid lens 320, a switching unit 350 disposed between the voltage control circuit 340 and the liquid lens 320, and a controller 360 for controlling the switching unit 350 and the voltage control circuit 340. Here, the liquid lens 320 is shown by schematizing the liquid lens described with reference to FIG. 4, 5 or 7, and may include four individual terminals L1, L2, L3 and L4 and one common terminal CO. In some embodiments, the number of individual terminals in the liquid lens 320 may be a multiple of four.

The switching unit 350 includes a plurality of first switches SW1 to SW4, which selects one of the first voltage and the ground voltage and transmits the selected voltage to the plurality of individual terminals L1, L2, L3 and L4, and a second switch SW0, which selects one of the first voltage and the ground voltage and transmits the selected voltage to the common terminal CO.

The controller 360 may control the voltage control circuit 340, the plurality of first switches SW1 to SW4, and the second switch SW0. For example, the controller 360 may output a first control signal X1 for activating the voltage control circuit 340, a plurality of second control signals X2 for activating the plurality of first switches SW1 to SW4, and a third control signal X3 for activating the second switch SW0.

According to an embodiment, the first control signal X1, the plurality of second control signals X2, and the third control signal X3 may be pulse width modulation (PWM) signals. The active period of each of the second control signals X2 and the third control signal X3 may be twice as long as the active period of the first control signal X1.

FIGS. 9(a) and 9(b) illustrate the voltage control circuit and the switching unit described with reference to FIG. 8. As an example, FIG. 9(a) illustrates a voltage control circuit 340A that generates a driving voltage of 70 V and a switching unit 350 that transmits the driving voltage of 70 V. FIG. 9(b) illustrates a voltage control circuit 340B that outputs a driving voltage of 40 V and a switching unit 350 that transmits the driving voltage of 40 V.

Figure 9:
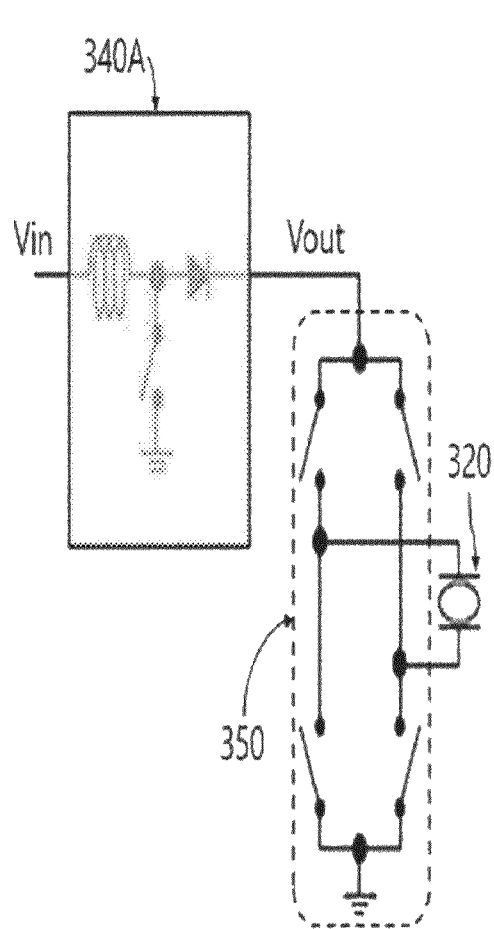
FIGS. 9(*a*) and 9(*b*) illustrate the voltage control circuit and the switching unit described with reference to FIG. 8.
Figure 9:
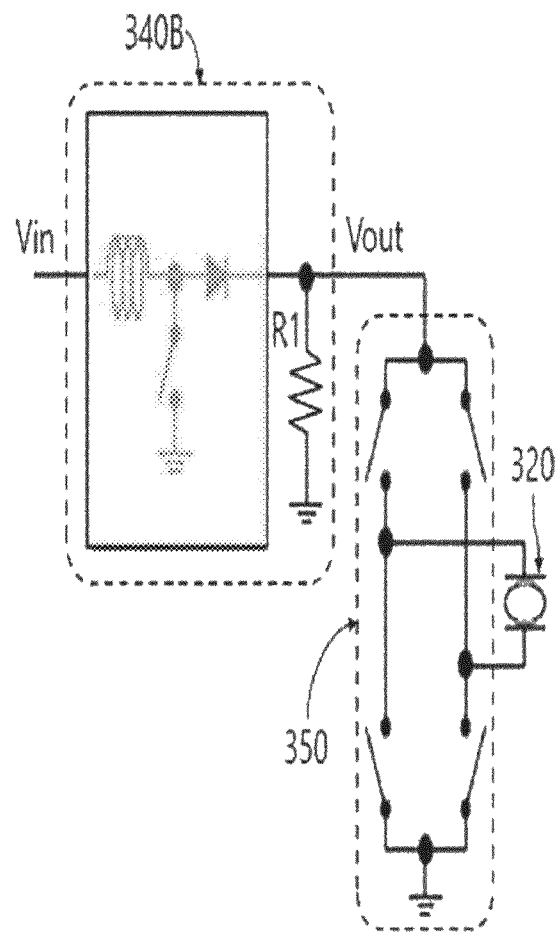

Referring to FIGS. 9(*a*) and 9(*b*), the structures of the liquid lens 320 and the switching unit 350 for transmitting the driving voltage to the liquid lens 320 are substantially the same. However, there is a structural difference between the voltage control circuit 340A shown in FIG. 9(*a*) and the voltage control circuit 340B shown in FIG. 9(*b*). For example, each of the two voltage control circuits 340A and 340B may include a voltage booster, such as a DC-DC converter, which converts any direct current power into direct current power having the form required by the load. However, the voltage control circuit 340B shown in FIG. 9(*b*), which outputs a driving voltage having a lower level, may further include a DC bias terminal including a resistor R1 connected to the output terminal of a voltage booster such as a DC-DC converter.

Figure 10A:
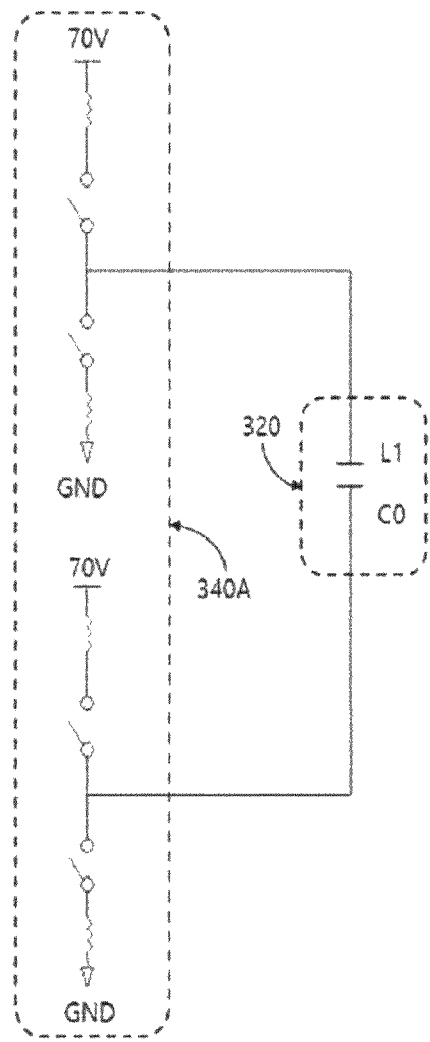
FIGS. 10(*a*) and 10(*b*) illustrate the voltage control circuit shown in FIG. 9(*a*).

FIGS. 10(*a*) and 10(*b*) illustrate the voltage control circuit shown in FIG. 9(*a*).

Figure 7:
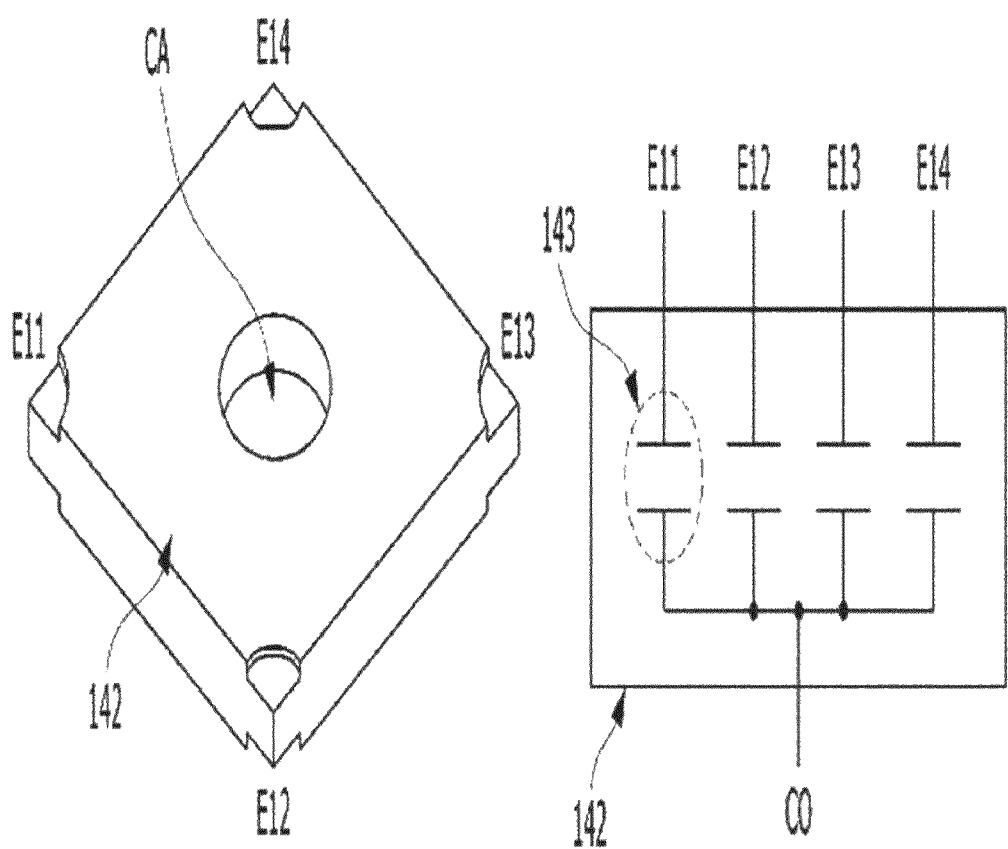
FIGS. 7(*a*) and 7(*b*) are views for explaining a liquid lens, the interface of which is adjusted to correspond to a driving voltage.

As illustrated, when electrical energy is applied through the two electrodes, the liquid lens 320 may have electrical characteristics resembling those of a capacitor (refer to FIG. 7(*b*)). For convenience of description, the case in which a driving voltage for inducing movement of the interface is supplied to one individual terminal L1 and a common terminal CO will be described by way of example.

Referring to FIG. 10(*a*), a voltage control circuit 340A capable of supplying a driving voltage of 70 V is connected to the individual terminal L1 and the common terminal CO of the liquid lens 320. The voltage control circuit 340A may supply one of the driving voltage of 70 V and the ground voltage to the individual terminal L1 or the common terminal CO.

Referring to FIG. 10(*b*), the voltage control circuit 340A may apply a driving voltage of 70 V to the individual terminal L1 or the common terminal CO during a preset first period P1. Here, the preset first period P1 may be determined by the switching unit 350, described with reference to FIG. 9(*a*). The voltage control circuit 340A for applying a driving voltage of 70 V to the liquid lens 320 needs to be capable of converting any direct current power to a driving voltage of 70 V. For example, when the camera module including the liquid lens 320 is mounted in a portable device, the power supply voltage used in the portable device generally ranges from 2.5 to 5 V. In order to generate a driving voltage of 70 V using a power supply voltage of 2.5 to 5 V, the voltage control circuit 340A is inevitably increased in volume, and radiation noise occurs due to the operation of switch elements included in the voltage control circuit 340A.

Radiation noise generated in the voltage control circuit 340A may attenuate the sensitivity of an antenna for wireless communication of a portable device. As a result of testing a portable device equipped with a camera module including the voltage control circuit 340A, which generates a driving voltage of 70 V, and the liquid lens 320, there may occur a problem in that the wireless communication sensitivity (RF wireless sensitivity) of the portable device may decrease to ⅕ to ⅓ during the operation of the camera module. When the camera module is operated, if the wireless communication sensitivity of the portable device decreases, it may be difficult to realize a video call through the portable device, it may be impossible to use the camera module during wireless communication, or it may be difficult to realize wireless communication during the use of the camera module. Meanwhile, when a larger amount of power is consumed in order to overcome the reduced wireless communication sensitivity, there may be a shortcoming in that a communication standby/available time is shortened due to the limited capacity of a battery of the portable device.

Figure 11A:
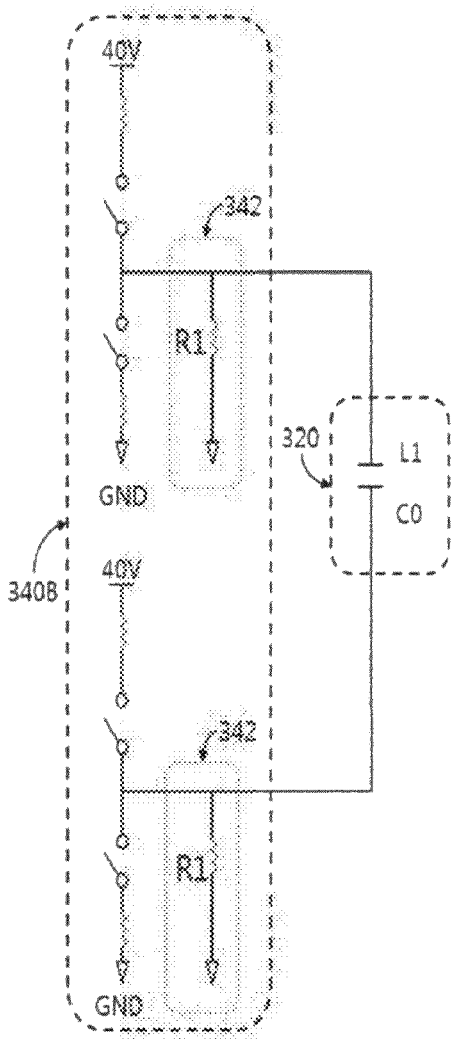
FIGS. 11(*a*) and 11(*b*) illustrate the voltage control circuit shown in FIG. 9(*b*).

FIGS. 11(*a*) and 11(*b*) illustrate the voltage control circuit shown in FIG. 9(*b*).

As illustrated, when electrical energy is applied through the two electrodes, the liquid lens 320 may have electrical characteristics resembling those of a capacitor (refer to FIG. 7(*b*)). For convenience of description, the case in which a driving voltage for inducing movement of the interface is supplied to one individual terminal L1 and a common terminal CO will be described by way of example.

Referring to FIG. 11(*a*), a voltage control circuit 340B capable of supplying a driving voltage of 40 V is connected to the individual terminal L1 and the common terminal CO of the liquid lens 320. The voltage control circuit 340B may supply one of the driving voltage of 40 V and 30 V and the ground voltage to the individual terminal L1 or the common terminal CO.

Referring to FIGS. 11(*a*) and 10(*a*), unlike the voltage control circuit 340A that generates a driving voltage of 70 V, the voltage control circuit 340B may generate a driving voltage of 40 V and may apply the same to the individual terminal L1 and the common terminal CO of the liquid lens 320. The voltage control circuit 340B for applying a driving voltage of 40 V to the liquid lens 320 needs to convert any direct current power into a driving voltage of 40 V. For example, when the camera module including the liquid lens 320 is mounted in a portable device, the power supply voltage used in the portable device generally ranges from 2.5 to 5 V. The voltage control circuit 340B needs to generate a driving voltage of 40 V using a power supply voltage of 2.5 to 5 V. Compared to the voltage control circuit 340A described with reference to FIG. 10(*a*), the voltage control circuit 340B may be greatly reduced in volume since a range within which the power supply voltage is boosted is greatly reduced. In addition, with the reduction in the range within which the voltage is boosted, radiation noise, which is caused by operation of switch elements included in the voltage control circuit 340B, is greatly reduced.

Meanwhile, the voltage control circuit 340B described with reference to FIG. 11(*a*) may include a DC bias terminal 342 including a resistor R1. Here, the DC bias terminal 342 may be disposed at each output terminal of the voltage control circuit 340B, which generates driving voltages to be applied to all of the individual terminals L1 to L4 and to the common terminal CO included in the liquid lens 320.

Referring to FIG. 11(*b*), the voltage control circuit 340B may apply a driving voltage of 40 V to the individual terminal L1 or the common terminal CO during a preset first period P1. Thereafter, a driving voltage of 30V may be applied to the individual terminal L1 or the common terminal CO in the liquid lens 320 during the preset first period P1. The second period P2 in which the driving voltage of 40 V and the driving voltage of 30 V are applied to the individual terminal L1 or the common terminal CO in the liquid lens 320 may be determined by the switching unit 350 described with reference to FIG. 9(*b*). Here, the second period P2 may have a length that is twice as long as the length of the first period P1.

First, when the voltage control circuit 340B applies the boosted driving voltage of 40 V and performs floating during the first period P1, charges applied to the individual terminal L1 or the common terminal CO in the liquid lens 320 may not escape at a high speed but may remain during the first period P1 due to high resistance of the DC bias terminal 342. At this time, the driving voltage of 40 V may be decreased at a predetermined rate according to the resistance of the resistor R1 included in the DC bias terminal 342. The resistor R1 of the DC bias terminal 342 may be designed such that the driving voltage of 40 V is maintained as a driving voltage of 30 V during the first period P1.

Figure 10B:
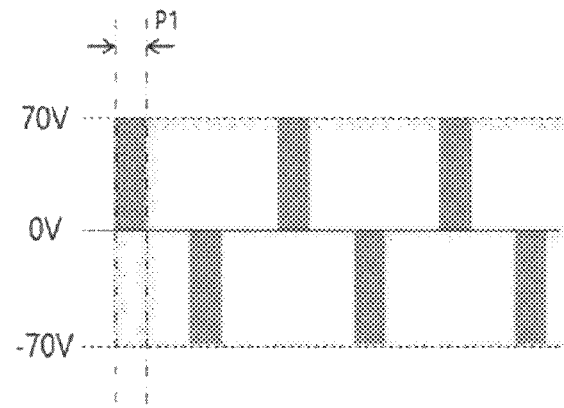
Figure 11B:
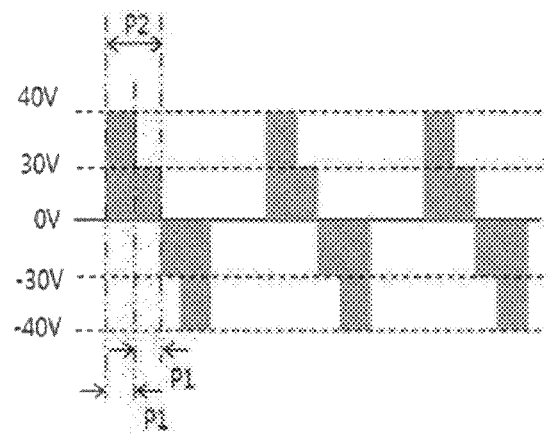

Comparing FIG. 10(b) and FIG. 11(b), it can be appreciated that the root-mean-square values Vrms of the driving voltage applied to the individual terminal L1 or the common terminal CO in the liquid lens 320 are the same. The amount of electrical energy for inducing movement of the interface in the liquid lens 320 may be understood as the root-mean-square value Vrms of the driving voltage. The area of the waveform of the driving voltage (the area indicated in gray in the drawing), which is applied to the individual terminal L1 or the common terminal CO in the liquid lens 320, corresponds to the root-mean-square value Vrms. Comparing FIG. 10(b) and FIG. 11(b), the heights (the magnitudes of the voltage) are different, and there is a difference between the periods during which the driving voltage is applied. However, the root-mean-square values Vrms of the driving voltage applied to the liquid lens 320 are substantially the same, and movement of the interface in the liquid lens 320 may be induced.

Figure 12:
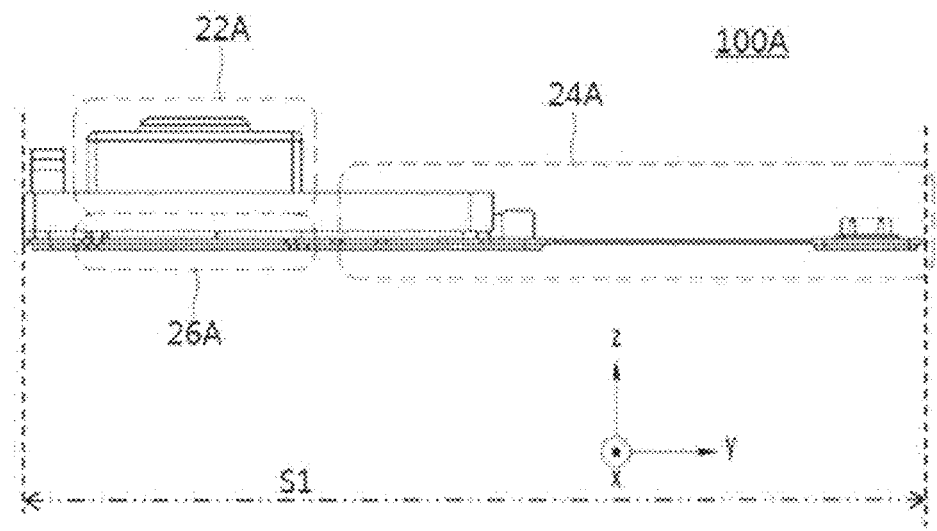
FIGS. 12(*a*) and 12(*b*) are views illustrating comparison between the camera modules including the voltage control circuits shown in FIGS. 9(*a*) and 9(*b*).
Figure 12:
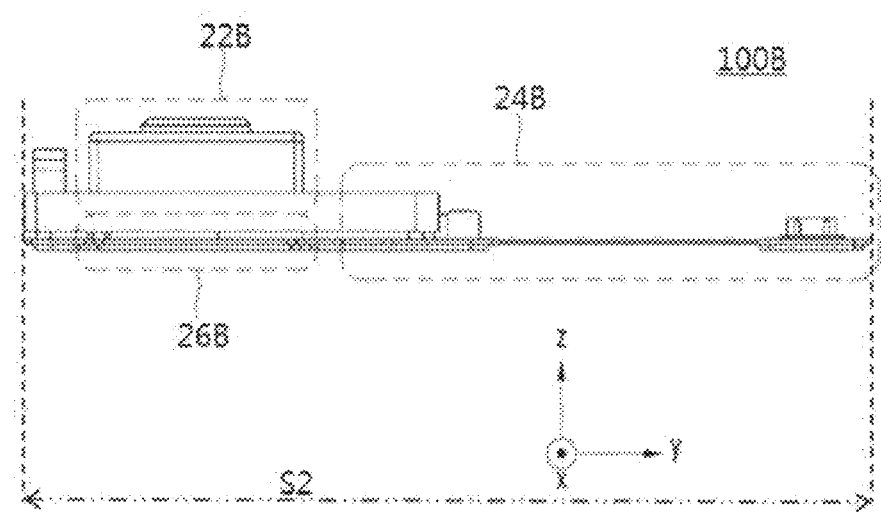

The camera modules including the voltage control circuits shown in FIGS. 9(a) and 9(b) will be compared with reference to FIGS. 12(a) and 12(b). Specifically, FIG. 12(a) illustrates the camera module 100A including the voltage control circuit 340A that generates a driving voltage of 70 V, and FIG. 12(b) illustrates the camera module 100B including the voltage control circuit 340B that generates a driving voltage of 40 V.

Comparing FIGS. 12(a) and 12(b), it can be appreciated that the overall size of the camera modules 100A and 100B decreases due to the reduction in the size and volume of the control circuits 24A and 24B. Compared to the size S1 of the camera module 100A including the voltage control circuit 340A that generates a driving voltage of 70 V, the size S2 of the camera module 100B including the voltage control circuit 340B that generates a driving voltage of 40 V may be reduced by about 15% or more. Reduction in the size and volume of the camera module 100B may increase the range within which the camera module 100B is capable of being applied to a portable device.

In addition, radiation noise, which occurs in the camera module 100B including the voltage control circuit 340B that generates a driving voltage of 40 V, may also be reduced. As a result, it is possible to minimize a decrease in the wireless communication sensitivity in a portable device equipped with the camera module 100B.

The above-described liquid lens may be included in the camera module. The camera module may include a lens assembly, which includes a liquid lens mounted in a housing and at least one solid lens that may be disposed on the front surface or the rear surface of the liquid lens, an image sensor for converting an optical signal transmitted through the lens assembly into an electrical signal, and a control circuit for supplying a driving voltage to the liquid lens.

Although only a limited number of embodiments have been described above, various other embodiments are possible. The technical contents of the above-described embodiments may be combined into various forms as long as they are not incompatible with one another, and thus may be implemented in new embodiments.

An optical device (or an optical instrument) including the above-described camera module may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. The optical device may further include a communication module, which may communicate with other devices, and a memory unit, which may store data. The communication module and the memory unit may be mounted in the body housing.

The method according to the embodiment described above may be programmed to be executed in a computer and may be stored on a computer-readable recording medium. Examples of the computer-readable recording medium may include ROM, RAM, a CD-ROM, a magnetic tape, a floppy disk, and an optical data storage device.

The computer-readable recording medium may also be distributed over network-coupled computer systems so that the computer-readable code is stored and executed in a distributed fashion. Also, functional programs, code, and code segments for accomplishing the above-described method may be easily construed by programmers skilled in the art to which the embodiment pertains.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

Mode for Invention

Various embodiments have been described in the best mode for carrying out the disclosure.

INDUSTRIAL APPLICABILITY

A liquid lens control circuit, a camera module, and a liquid lens control method according to embodiments may be used in camera/video devices, telescopic devices, microscopic devices, an interferometer, a photometer, a polarimeter, a spectrometer, a reflectometer, an auto-collimator, a lens-meter, a smartphone, a laptop computer, a tablet computer, etc.

The invention claimed is:
1. A camera module, comprising:
a liquid lens; a voltage control circuit; and a switching unit;
wherein the liquid lens comprises:
a first plate comprising a cavity in which a conductive liquid and a non-conductive liquid are disposed;
a second plate disposed above the first plate; and
a third plate disposed below the first plate,
wherein a common electrode is disposed on one side of the first plate,
wherein a plurality of individual electrodes are disposed on an opposite side of the first plate, wherein the voltage control circuit comprises:
a first voltage generator configured to output a first voltage; and
a DC bias terminal disposed between an output terminal of the first voltage generator and a ground voltage,
wherein the switching unit comprises:
a plurality of first switches configured to transmit one selected from the first voltage and the ground voltage to the plurality of individual electrodes; and
a second switch configured to transmit one selected from the first voltage and the ground voltage to the common electrode,
wherein the first voltage is applied to the plurality of individual electrodes or the common electrode during a first predetermined period of time,
wherein after application of the first voltage, a second voltage that is lower than the first voltage and is higher than the ground voltage is applied to the plurality of individual electrodes or the common electrode during a second predetermined period of time, and
wherein a level of the first voltage is decreased to a level of the second voltage by the DC bias terminal,
wherein a sum of the first voltage and the second voltage is 70 V, and
wherein a ratio of the first voltage to the second voltage corresponds to a resistance of a resistor included in the DC bias terminal.

2. The camera module according to claim 1 wherein the first voltage is 40 V, and
wherein the second voltage is 30 V.

3. The camera module according to claim 1 wherein the DC bias terminal comprises the resistor disposed between an output terminal of the first voltage generator and the ground voltage.

4. The camera module according to claim 1 wherein the first voltage generator outputs the first voltage during the first predetermined period of time, and
wherein the plurality of first switches or the second switch connect the plurality of individual electrodes or the common electrode to the first voltage generator during a predetermined duration that is twice as long as the first predetermined period of time.

5. The camera module according to claim 1, comprising:
a controller configured to control the first voltage generator, the plurality of first switches, and the second switch,
wherein the controller is configured to output:
a first control signal to activate the first voltage generator;
a plurality of second control signals to activate the plurality of first switches; and
a third control signal to activate the second switch.

6. The camera module according to claim 5, wherein the first control signal, the plurality of second control signals, and the third control signal are pulse width modulation (PWM) signals, and
wherein an activation period of the plurality of second control signals and an activation period of the third control signal are twice as long as an activation period of the first control signal.

7. The camera module according to claim 5, wherein a number of the plurality of individual electrodes, a number of the plurality of first switches, and a number of the plurality of second control signals are a multiple of four and are same as one another.

8. The camera module according to claim 1, wherein the first voltage generator comprises a DC-DC converter configured to convert any direct current power into direct current power having a form required by a load.

9. The camera module according to claim 1, wherein the DC bias terminal is disposed at each output terminal of the voltage control circuit, which generates driving voltages to be applied to all of the plurality of individual electrodes and to the common electrode.

10. The camera module according to claim 1, wherein the switching unit supplies one of the first voltage, a second voltage, and the ground voltage to a corresponding individual electrode among the plurality of individual electrodes or the common electrode.

11. The camera module according to claim 1,
wherein a total period during which the first and second voltages are applied is twice as long as a length of a period during which each of the first and second voltages is applied.

12. The camera module according to claim 1, wherein a value of a resistor included in the DC bias terminal is determined such that the first voltage is maintained as the second voltage during the second predetermined period of time.

13. The camera module according to claim 1, comprising a controller configured to adjust the first and/or the second predetermined period of time through controlling the switching unit.

14. A camera module, comprising:
a liquid lens; a voltage control circuit; and a switching unit:
wherein the liquid lens comprises:
a first plate comprising a cavity in which a conductive liquid and a non-conductive liquid are disposed;
a second plate disposed above the first plate;
a third plate disposed below the first plate;
a common electrode disposed on one side of the first plate; and
a plurality of individual electrodes disposed on an opposite side of the first plate,
wherein the voltage control circuit comprises:
a first voltage generator configured to output a first voltage; and
a load having one end connected to an output terminal of the first voltage generator and the other end connected to a reference voltage,
wherein the switching unit is connected between the one end of the load and the reference voltage,
wherein the switching unit comprises:
a plurality of first switches configured to transmit one selected from the first voltage and the reference voltage to the plurality of individual electrodes; and
a second switch configured to transmit one selected from the first voltage and the reference voltage to the common electrode,
wherein the first voltage is applied to the plurality of individual electrodes or the common electrode during a first predetermined period of time,
wherein, after application of the first voltage, a second voltage that is lower than the first voltage and is higher than the reference voltage is applied to the plurality of individual electrodes or the common electrode during a second predetermined period of time,
wherein a level of the first voltage is decreased to a level of the second voltage by the load,
wherein a sum of the first voltage and the second voltage is 70 V, and wherein a ratio of the first voltage to the second voltage corresponds to a resistance of a resistor included in the load.

15. The camera module according to claim 14, wherein a value of the load is determined such that the first voltage is maintained as the second voltage during the second predetermined period of time.

16. The camera module according to claim 14, comprising a controller configured to adjust the first and/or the second predetermined period of time through controlling the switching unit.

17. The camera module according to claim 16, wherein the controller is configured to output:
 a first control signal to activate the first voltage generator;
 a plurality of second control signals to activate the plurality of first switches; and
 a third control signal to activate the second switch.

* * * * *